(12) United States Patent
Kintou

(10) Patent No.: US 9,563,967 B2
(45) Date of Patent: Feb. 7, 2017

(54) PHOTOGRAPHIC SUBJECT TRACKING DEVICE AND CAMERA

(71) Applicant: NIKON CORPORATION, Tokyo (JP)

(72) Inventor: Hiroshi Kintou, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/413,282

(22) PCT Filed: Jul. 17, 2013

(86) PCT No.: PCT/JP2013/069427
§ 371 (c)(1),
(2) Date: Jul. 21, 2015

(87) PCT Pub. No.: WO2014/014031
PCT Pub. Date: Jan. 23, 2014

(65) Prior Publication Data
US 2015/0356743 A1    Dec. 10, 2015

(30) Foreign Application Priority Data

Jul. 17, 2012  (JP) ................................. 2012-158795

(51) Int. Cl.
*G06K 9/62* (2006.01)
*G06T 7/20* (2006.01)
(Continued)

(52) U.S. Cl.
CPC .............. *G06T 7/204* (2013.01); *G06K 9/6202* (2013.01); *G06K 9/6215* (2013.01); *G06T 3/40* (2013.01);
(Continued)

(58) Field of Classification Search
CPC ................ G06K 9/6202; G06K 9/6215; G06T 2207/10004; G06T 2207/20012; G06T 2207/20081;G06T 2207/30196; G06T 3/40; G06T 7/0044; G06T 7/204
See application file for complete search history.

(56) References Cited

U.S. PATENT DOCUMENTS

| | | | |
|---|---|---|---|
| 2005/0195285 A1* | 9/2005 | Ide ......................... | H04N 5/772 348/208.99 |
| 2006/0104517 A1 | 5/2006 | Ko et al. | |
| 2010/0165113 A1* | 7/2010 | Abe ..................... | G06K 9/6203 348/169 |

FOREIGN PATENT DOCUMENTS

| | | |
|---|---|---|
| JP | 3768073 B2 | 4/2006 |
| JP | 2006-146922 A | 6/2006 |

(Continued)

OTHER PUBLICATIONS

Aug. 27, 2013 International Search Report issued in International Application No. PCT/JP2013/069427.

(Continued)

*Primary Examiner* — Siamak Harandi
(74) *Attorney, Agent, or Firm* — Oliff PLC

(57) ABSTRACT

A photographic subject tracking device includes: a first degree-of-similarity calculation unit that calculates degree of similarity between a template image for tracking and an image in search area; a photographic subject position identification unit that identifies a tracked photographic subject position in the input image based on calculated degree of similarity; a second degree-of-similarity calculation unit that calculates a degree of similarity between each of multiple template images for resizing determination, which are generated based on template image for tracking, and image in search area; a matching position identification unit that identifies matching positions of the multiple template images for resizing determination, respectively, in the input image based on calculated degrees of similarity; and a size changing unit that changes an image size of template image (Continued)

for tracking and template images for resizing determination based on a density of the plurality of matching positions identified.

11 Claims, 14 Drawing Sheets

(51) Int. Cl.
G06T 3/40 (2006.01)
G06T 7/00 (2006.01)
(52) U.S. Cl.
CPC ... G06T 7/0044 (2013.01); *G06T 2207/10004* (2013.01); *G06T 2207/20012* (2013.01); *G06T 2207/20081* (2013.01); *G06T 2207/30196* (2013.01)

(56) References Cited

FOREIGN PATENT DOCUMENTS

JP 2010-157792 A 7/2010
WO 2008/114683 A1 9/2008

OTHER PUBLICATIONS

Sep. 8, 2016 Office Action issued in Chinese Patent Application No. 201380048010.6.

\* cited by examiner

FIG.6
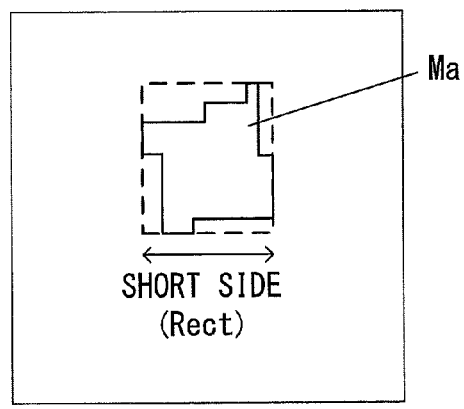
(A)
SHORT SIDE (Rect)
Ma
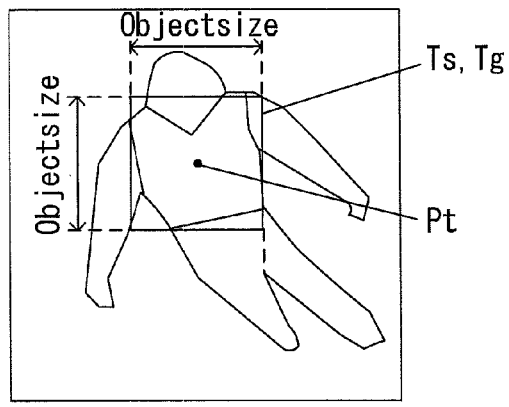
(B)
Objectsize
Objectsize
Ts, Tg
Pt

FIG.7
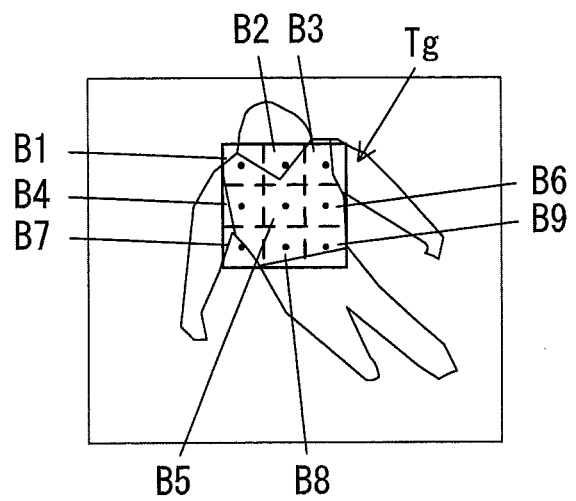
(A)
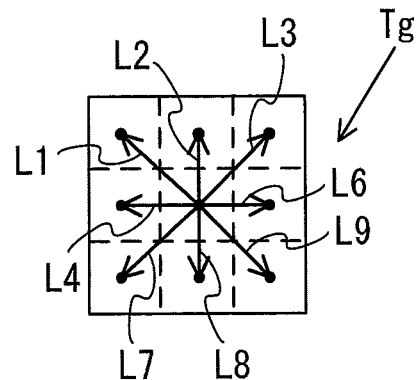
(B)

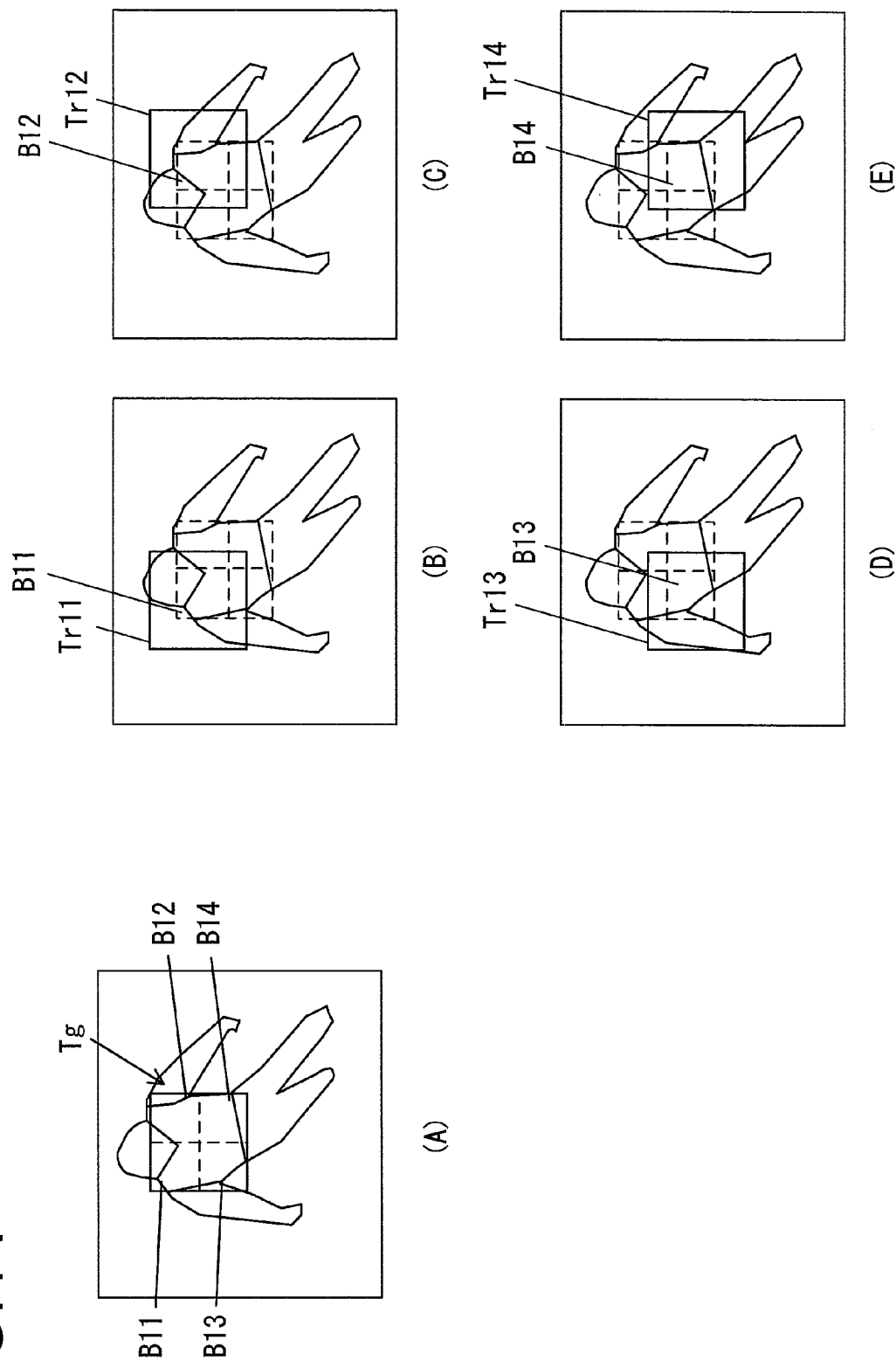

PHOTOGRAPHIC SUBJECT TRACKING DEVICE AND CAMERA

TECHNICAL FIELD

The present invention relates to a photographic subject tracking device and a camera.

BACKGROUND ART

A subject tracking device described below is known. Since this subject tracking device responds to changes in a photographic subject, template matching is performed by using a plurality of different template images and the template images are updated by using a template image with the highest degree of similarity (see Patent Literature 1).

CITATION LIST

Patent Literature

PTL 1: Japanese Patent No. 3768073

SUMMARY OF INVENTION

Technical Problem

However, with a conventional subject tracking device, the size of a template image does not change even if the size of a photographic subject has changed. So, the conventional subject tracking device cannot track the photographic subject, whose size changes, with excellent precision.

Solution to Problem

A photographic subject tracking device according to a first aspect of the present invention, comprises: a search area setting unit that sets a search area in an input image; a first degree-of-similarity calculation unit that calculates a degree of similarity between a template image for tracking and an image in the search area; a photographic subject position identification unit that identifies a tracked photographic subject position in the input image based on the degree of similarity calculated by the first degree-of-similarity calculation unit; a second degree-of-similarity calculation unit that calculates a degree of similarity between each of multiple template images for resizing determination, which are generated based on the template image for tracking, and the image in the search area; a matching position identification unit that identifies matching positions of the multiple template images for resizing determination, respectively, in the input image based on degrees of similarity calculated by the second degree-of-similarity calculation unit; and a size changing unit that changes an image size of the template image for tracking and the template images for resizing determination based on a density of the plurality of matching positions identified by the matching position identification unit.

According to a second aspect of the present invention, in the photographic subject tracking device according to the first aspect, it is preferable that when the density of the plurality of matching positions identified by the matching position identification unit has changed by a predetermined amount or more, the size changing unit changes the image size of the template image for tracking and the template images for resizing determination.

According to a third aspect of the present invention, in the photographic subject tracking device according to the first or second aspect, it is preferable that when the density of the plurality of matching positions identified by the matching position identification unit has changed to a higher value, the size changing unit reduces the image size; and when the density of the plurality of matching positions identified by the matching position identification unit has changed to a lower value, the size changing unit increases the image size.

According to a fourth aspect of the present invention, in the photographic subject tracking device according to any one of the first to third aspects, it is preferable that the size changing unit selects matching positions, whose degrees of similarity calculated by the second degree-of-similarity calculation unit are equal to or higher than a predetermined value, from among the plurality of matching positions identified by the matching position identification unit, and changes the image size based on the density of the selected matching positions.

According to a fifth aspect of the present invention, in the photographic subject tracking device according to any one of the first to fourth aspects, it is preferable that each of the multiple template images for resizing determination is an image containing a different part of the template image for tracking.

According to a sixth aspect of the present invention, in the photographic subject tracking device according to the fifth aspect of the present invention, it is preferable that each of the multiple template images for resizing determination is an image of a predetermined size, each image of the predetermined size being centered at a center position of one of a plurality of blocks into which the template image for tracking is divided.

According to a seventh aspect of the present invention, in the photographic subject tracking device according to the sixth aspect, it is preferable that the size changing unit changes the image size of the template image for tracking and the template images for resizing determination based on the density of matching positions of template images for resizing determination other than one template image for resizing determination, with reference to a matching position of the one template image for resizing determination which is centered at the center position of the center block among the plurality of blocks.

According to an eighth aspect of the present invention, in the photographic subject tracking device according to the seventh aspect, it is preferable that when a maximum degree of similarity between the one template image for resizing determination, which is centered at the center position of the center block among the plurality of blocks, and the image in the search area is equal to or more than a predetermined value, the size changing unit determines whether or not to change the image size of the template image for tracking and the template images for resizing determination.

A photographic subject tracking device according to a ninth aspect of the present invention comprises: a search area setting unit that sets a search area in an input image; a first degree-of-similarity calculation unit that calculates a degree of similarity between an initial template image and an image in the search area and a degree of similarity between a synthetic template image and the image in the search area; a photographic subject position identification unit that identifies a tracked photographic subject position in the input image based on the degrees of similarity calculated by the first degree-of-similarity calculation unit; an update judgment unit that judges whether or not to update the synthetic template image, based on the degrees of similarity calculated by the first degree-of-similarity calculation unit; an update unit that sets an image, which is obtained by synthesizing an image including the tracked photographic subject position in the input image with the initial template image, as a new synthetic template image when the update judgment unit determines to update the synthetic template image; a second degree-of-similarity calculation unit that calculates a degree of similarity between each of multiple template images for resizing determination and the image in the search area; a matching position identification unit that identifies matching positions of the multiple template images for resizing determination, respectively, in the input image based on degrees of similarity calculated by the second degree-of-similarity calculation unit; a size change judgment unit that judges whether or not to change an image size of the initial template image, the synthetic template image, and the template images for resizing determination, based on a density of the plurality of matching positions identified by the matching position identification unit; and a size changing unit that changes the image size of the initial template image to a new image size when the size change judgment unit determines to change the image size; wherein when the size change judgment unit determines to change the image size, the update unit sets an image of the new image size, including the tracked photographic subject position in the input image, as a new updated synthetic template image, further divides the updated synthetic template image into a plurality of blocks, and sets images of the new image size, each including one of the blocks in the input image, as new updated template images for resizing determination.

A photographic subject tracking device according to a tenth aspect of the present invention comprises: a tracking means that tracks a specified photographic subject in an image based on a template image; a detection means that detects a change of a size of the specified photographic subject; and an update means that updates the template image when the detection means detects that the size of the specified photographic subject has changed by a predetermined amount or more.

A camera according to an eleventh aspect of the present invention comprises the photographic subject tracking device according to any one of the first to tenth aspects.

Advantageous Effect of Invention

A photographic subject, whose size changes, can be tracked with excellent precision according to the present invention.

BRIEF DESCRIPTION OF DRAWINGS

FIG. 6 shows diagrams explaining generation of an initial template image;

FIG. 7 shows diagrams explaining generation of template images for resizing determination;

FIG. 14 shows diagrams explaining generation of resizing determination template images according to Variation 1.

DESCRIPTION OF EMBODIMENTS

Figure 1:
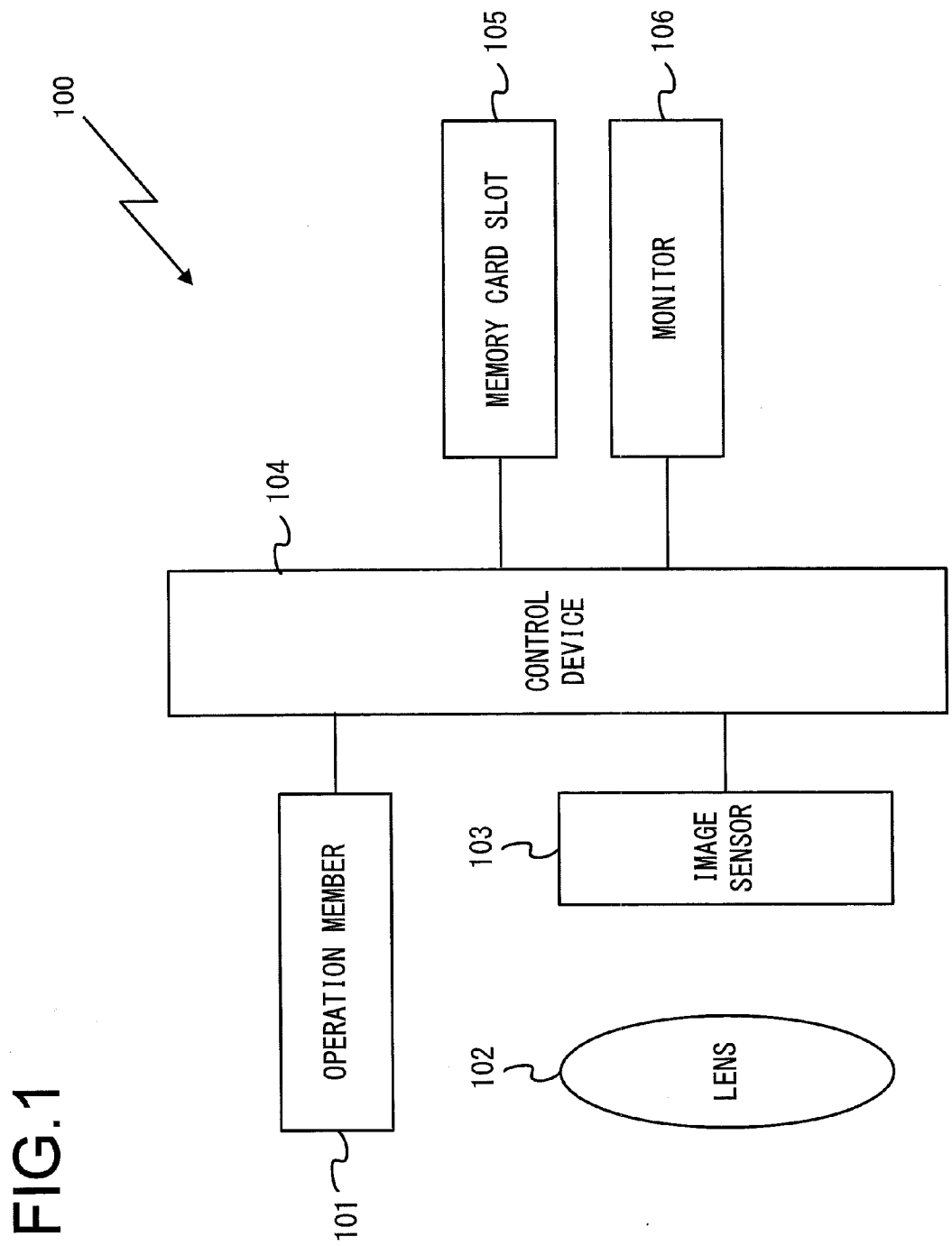
FIG. 1 shows a block diagram explaining a configuration example of a camera according to one embodiment of the present invention.

An embodiment for carrying out the present invention will be explained below with reference to drawings. FIG. 1 shows a block diagram illustrating the configuration of one embodiment of a camera according to this embodiment. A camera 100 comprises an operation member 101, a lens 102, an image sensor 103, a control device 104, a memory card slot 105, and a monitor 106. The operation member 101 includes various input members, such as a power source button, a shutter release button, a zoom button, a cross key, a select button, a replay button, and a delete button, which are operated by a user.

The lens 102 is composed of a plurality of optical lenses, but FIG. 1 shows one lens as a representative of those lenses. The image sensor 103 is an image sensor such as a CMOS or the like and captures a photographic subject image formed by the lens 102. Then, an image signal obtained by capturing the image is output to the control device 104.

The control device 104 is composed of a CPU, a memory, and other peripheral circuits and controls the camera 100. Incidentally, the memory which constitutes the control device 104 includes an SDRAM and a flash memory. The SDRAM is a volatile memory, which is used by the CPU as a work memory to load programs when executing the programs, and is used as a buffer memory to temporarily record data. Furthermore, the flash memory is a nonvolatile memory in which, for example, data for the programs executed by the control device 104 and various parameters read upon execution of programs are recorded.

The control device 104 generates image data of a predetermined image format such as a JPEG format (hereinafter referred to as the "main image data") based on the image signal input from the image sensor 103. The control device 104 also generates display image data such as thumbnail image data based on the generated image data. The control device 104 generates an image file, which includes the generated main image data and thumbnail image data and to which header information is further added, and then outputs the image file to the memory card slot 105. In this embodiment, both the main image data and the thumbnail image data are designed to be image data represented by an RGB colorimetric system.

The memory card slot 105 is a slot for inserting a memory card as a storage medium. The control device 104 writes and records the image file in the memory card. The control device 104 also reads image files stored in the memory card.

The monitor 106 is a liquid crystal monitor (back face monitor) mounted on a back face of the camera 100 and the monitor 106 displays, for example, images stored in the memory card and a setting menu for setting the camera 100. Furthermore, when a mode of the camera 100 is set to a photographing mode by the user, the control device 104 outputs display image data of images, which are obtained in chronological order from the image sensor 103, to the monitor 106. As a result, a live view image (through image) is displayed on the monitor 106.

Figure 2:
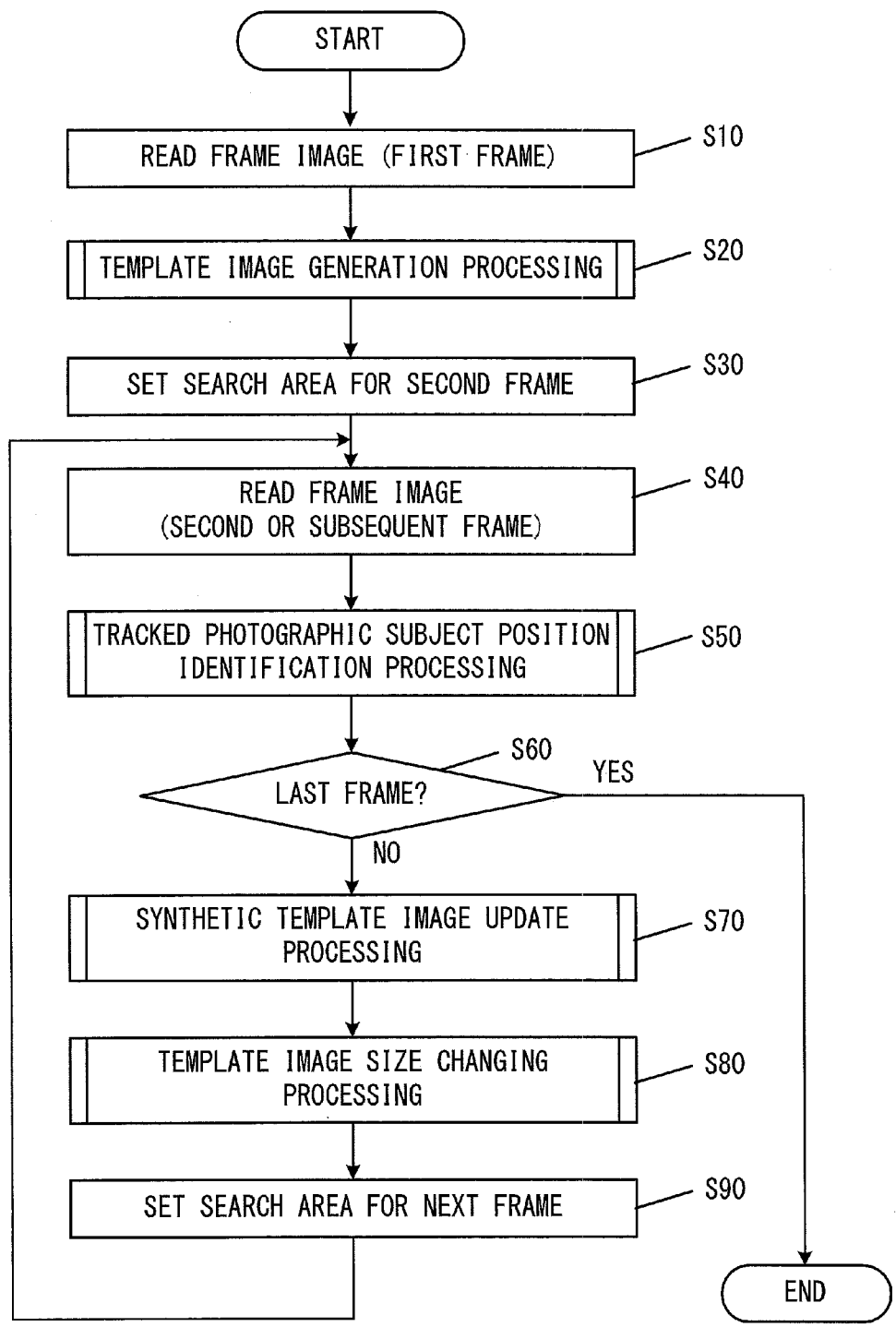
FIG. 2 shows a flowchart illustrating a flow of photographic subject tracking processing.

FIG. 2 shows a flowchart illustrating a flow of photographic subject tracking processing according to this embodiment. The processing shown in FIG. 2 is executed by the control device 104 as a program activated when the image sensor 103 starts inputting a through image.

The control device 104 reads a frame image (first frame image) input from the image sensor 103 in step S10 and then proceeds to step S20. The size of the frame image to be read is, for example, 360×240 pixels. The control device 104 converts the frame image represented by the RGB colorimetric system into a luminance image made of a luminance component (a Y component) and color difference images made of color difference components (a Cb component and a Cr component) in a YCbCr color space. Incidentally, if the frame image input from the image sensor 103 is represented by YCbCr, this conversion processing is unnecessary.

Figure 3:
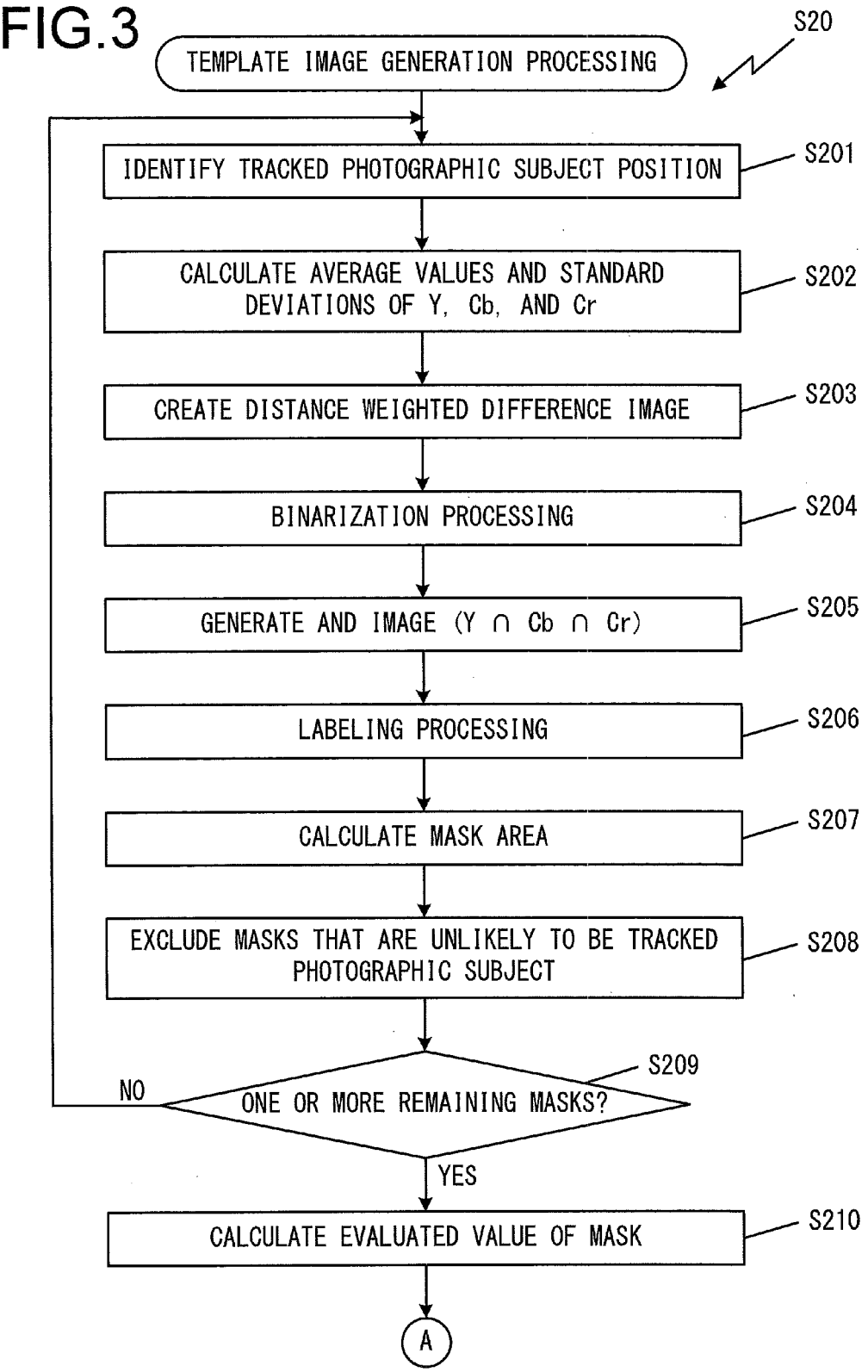
FIG. 3 shows a flowchart illustrating the details of template image generation processing.

The control device 104 executes template image generation processing in step S20. Now, the details of the template image generation processing will be explained using FIG. 3 and FIG. 4. In step S201 of FIG. 3, the control device 104 identifies the position of a photographic subject to be tracked (a tracked photographic subject) in the frame image; and then proceeds to step S202. In this embodiment, the user is prompted to designate the tracked photographic subject position in the frame image and the position input by the user by operating the operation member 101 is identified as the tracked photographic subject position.

In step S202, the control device 104 calculates an average value of the Y components, an average value of the Cb components, and an average value of the Cr components, respectively, in an area of 3×3 pixels which is centered at the above-mentioned tracked photographic subject position. The control device 104 also calculates a standard deviation of the Y components, a standard deviation of the Cb components, and a standard deviation of the Cr components, respectively, in the entire frame image. It should be noted that in this embodiment, not the average value of the entire frame image, but the average value calculated for the 3×3 pixel area which is centered at the tracked photographic subject position is used for calculation of these standard deviations.

Subsequently, the processing proceeds to step S203, where the control device 104 subtracts the average value of each of the Y components, the Cb components, and the Cr components, which was calculated in step S202, from a value of each pixel of the luminance image (a Y image) and the color difference images (a Cb image and a Cr image) of the frame image, respectively, and creates difference images based on absolute values of subtraction.

Furthermore, the control device 104 calculates a distance weighting coefficient corresponding to the distance from a rectangle of a predetermined size (for example, 30×30 pixels) which is centered at the above-mentioned tracked photographic subject position. Incidentally, the distance weighting coefficient is calculated so that the longer the distance from the rectangle becomes (that is, the farther a relevant position is located away from the above-mentioned tracked photographic subject position, the larger the distance weighting coefficient becomes. Then, the control device 104 creates a distance weighted difference image for each of the Y component, the Cb component, and the Cr component by multiplying the value of each pixel of each difference image of the Y component, the Cb component, and the Cr component by the distance weighting coefficient. As a result of this processing, noise in the background can be eliminated. Subsequently, the processing proceeds to step S204.

Figure 5:
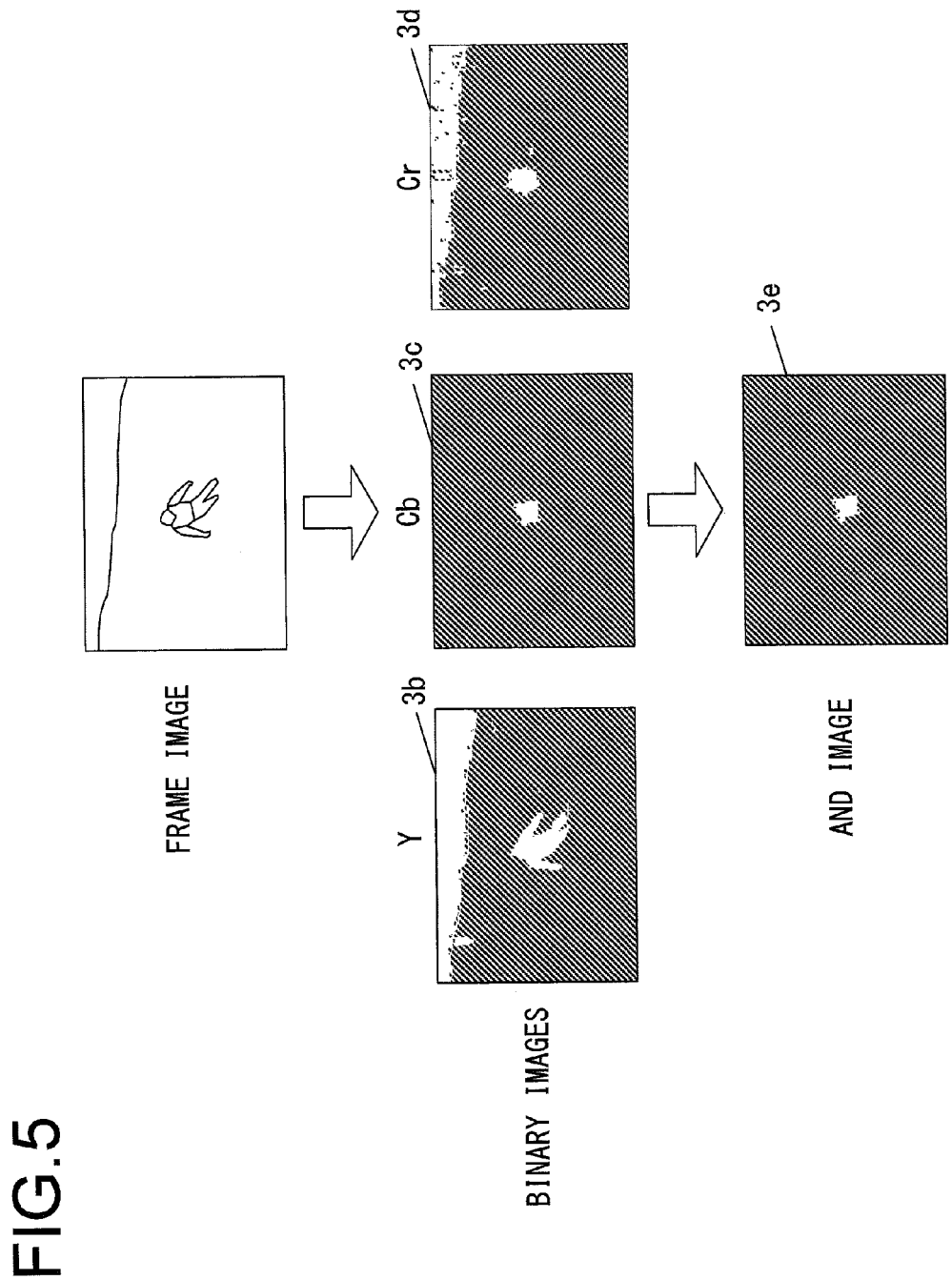
FIG. 5 shows diagrams explaining binary images and an AND image.

In step S204, the control device 104 generates binary images 3b to 3d of the Y component, the Cb component, and the Cr component, respectively, as shown in FIG. 5, by executing binarization processing on the distance weighted difference images generated in step S203. Incidentally, in FIG. 5, hatched areas are areas of black pixels.

Specifically speaking, regarding the binarization processing on the distance weighted difference image of the Y component, a value obtained by multiplying the standard deviation of the Y components, which was calculated in step S202, by a predetermined coefficient (for example, 0.6) is defined as a threshold. Then, the binary image is generated by setting pixels, each of which has a pixel value smaller than the threshold, as black pixels and setting other pixels as white pixels.

The same processing as in the case of the Y component is executed for the binarization processing on the distance weighted difference image of the Cb component. However, when the average value aveCb and the standard deviation sigCb of the Cb components, which were calculated in step S202, satisfy both the following expressions (1) and (2), a threshold thCb calculated according to the following expression (3) is used to adapt the binarization processing to achromatic scenes.

$$118 < aveCb < 138 \tag{1}$$

$$sigCb < abs(aveCb - 128) + 3 \tag{2}$$

$$thCb = \alpha \times sigCb \times [\{abs(aveCb-128)+3\}/sigCb]^{1/2} \times [10/\{abs(aveCb-128)+0.1\}]^{1/2} \tag{3}$$

Incidentally, regarding expressions (2) and (3), abs represents a function that takes an absolute value. Furthermore, regarding expression (3), α is, for example, 0.6.

Moreover, the same processing as in the case of the Cb component is executed for the binarization processing on the distance weighted difference image of the Cr component.

Then, the processing proceeds to step S205, where the control device 104 synthesizes the binary images 3b to 3d of the Y component, the Cb component, and the Cr component, which were generated in step S204, by ANDing them and thereby generates an AND image (synthetic image) 3e; and then the processing proceeds to step S206.

In step S206, the control device 104 crops an area of a predetermined range (for example, an area of 180×180 pixel size), which is centered at the tracked photographic subject position, in the above-mentioned AND image. High-speed processing can be realized by executing subsequent processing on the crop image, as a target, which is obtained as a result of this crop processing. Then, the control device 104 generates a labeling image by executing 8-direction labeling processing on the crop image; and proceeds to step S207.

In step S207, the control device 104 extracts at least one cluster of white pixels as a mask from the labeling image created by the above-mentioned labeling processing, calculates the area of the extracted mask, and then proceeds to step S208.

In step S208, the control device 104 performs a control to exclude one or more masks, which are unlikely to be the tracked photographic subject, based on the area of the above-mentioned mask. Specifically speaking, only a mask regarding which a value obtained by dividing the mask area by a screen area of the above-mentioned AND image is larger than a predetermined lower limit value (for example, 0.0001) is made to remain and other masks are excluded from targets of subsequent processing. As a result, high-speed processing can be realized by excluding the masks, which are unlikely to be the tracked photographic subject, from the targets of the subsequent processing.

Then, the processing proceeds to step S209, where the control device 104 judges whether there is one or more masks which were not excluded in step S208 (that is, remaining mask(s)). If the number of the remaining masks is 0, this means that a mask which is likely to be the tracked photographic subject fails to be detected. In this case, the control device 104 makes a negative judgment in step S209, returns to step S201, and then the user is allowed to input the tracked photographic subject position again. It should be noted that, in this case, the photographic subject tracking processing may be terminated by determining that it is impossible to track the tracked photographic subject position. On the other hand, if the number of remaining masks is one or more, the control device 104 returns an affirmative judgment in step S209 and proceeds to step S210.

In step S210, the control device 104 calculates an inertia moment IM of each remaining mask by using the following expression (4).

$$IM = \Sigma\Sigma\{(x-x_g)^2 + (y-y_g)^2\} \quad (4)$$

Incidentally, regarding expression (4), (x, y) is coordinates of a pixel of the mask and $(x_g, y_g)$ is coordinates of the tracked photographic subject position.

Then, the control device 104 calculates an evaluated value of each remaining mask based on the above-mentioned inertia moment IM and the mask area calculated in step S207 according to the following expression (5).

$$\text{Evaluated Value} = (\text{Mask Area})^\beta / IM \quad (5)$$

Incidentally, regarding expression (5), a value of β should preferably be a value larger than 1, for example, 1.5.

Figure 4:
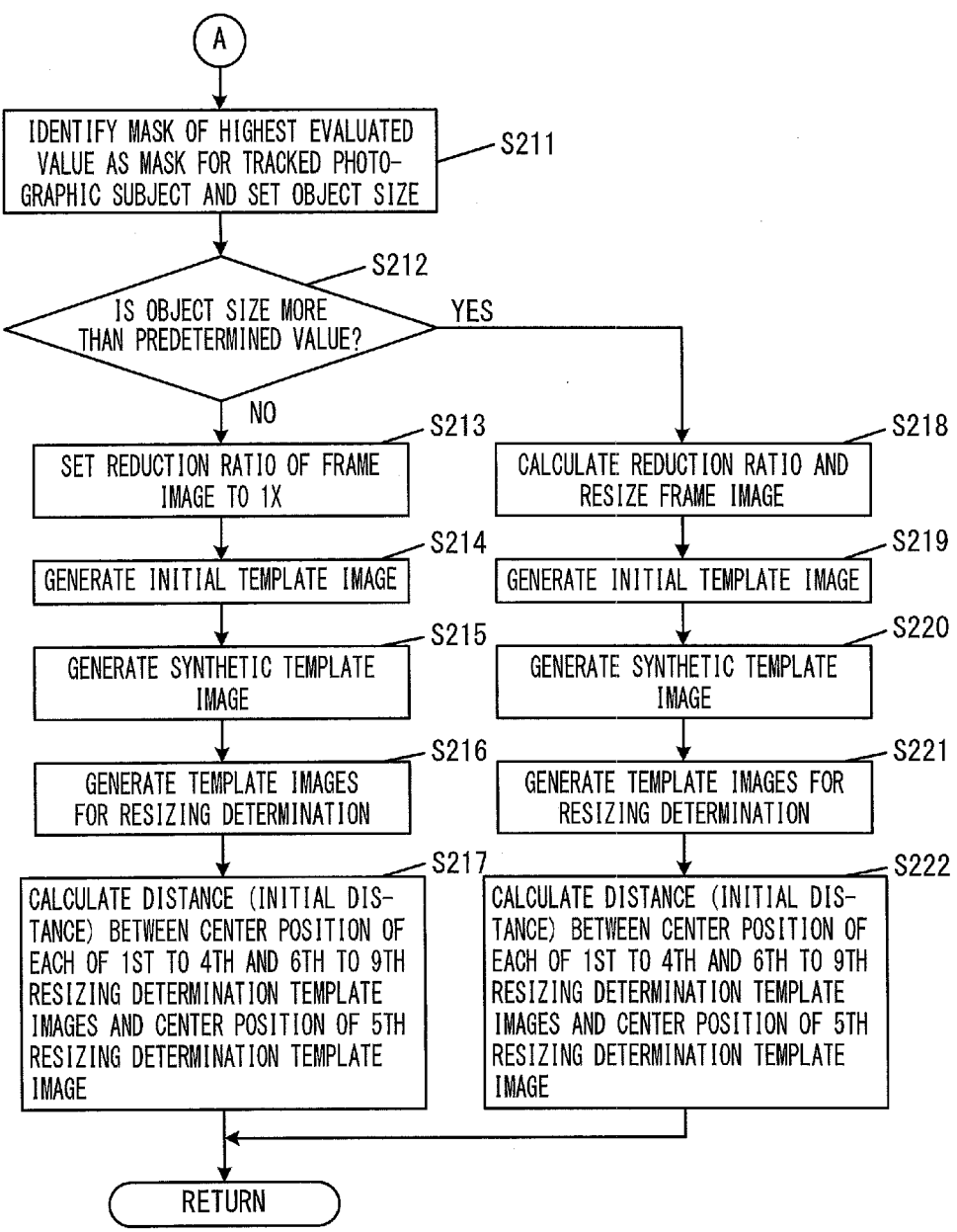
FIG. 4 shows a flowchart that follows FIG. 3.

Subsequently, the processing proceeds to step S211 of FIG. 4, where the control device 104 identifies a mask whose evaluated value is maximum, as a mask which is likely to be the tracked photographic subject. Then, the control device 104 sets a value indicative of the size of the tracked photographic subject (hereinafter referred to as a object size (Objectsize)) based on a short side Rect of a rectangle enveloping this identified mask Ma as shown in FIG. 6(A). Specifically speaking, in a case of Rect>240, Rect is set to 240 (Rect=240); and in a case of Rect<9, Rect is set to 6 (Rect=6). Then, the object size is set to a value which is equal to a multiple of 3 and is close to the short side Rect, by calculating the object size according to the following expression (6). This is to divide a resizing determination template image, whose size is set based on the object size, into 3×3 blocks by processing described later.

$$\text{Objectsize} = \text{floor}(\text{Rect}/3) \times 3 \quad (6)$$

Incidentally, regarding expression (6), floor represents a function that removes numbers after a decimal point.

Then, the processing proceeds to step S212, where the control device 104 judges whether or not the object size decided in step S211 is greater than a predetermined value (24 pixels in this embodiment). Incidentally, this predetermined value is a maximum value of the size of a template image which can be treated by the template matching processing and decided according to, for example, hardware restrictions for the control device 104. If the object size is greater than the predetermined value, the control device 104 returns an affirmative judgment in step S212 and proceeds to step S218. On the other hand, if the object size is equal to or less than the predetermined value, the control device 104 returns a negative judgment in step S212 and proceeds to step S213.

In step S213, the control device 104 sets a reduction ratio Shuku of the frame image to x1, records the reduction ratio in a memory (not shown in the drawing), and then proceeds to step S214.

In step S214, the control device 104 generates an image of Objectsize×Objectsize, which is centered at the above-mentioned tracked photographic subject position Pt as shown in FIG. 6(B) in the frame image read in step S10, as an initial template image Ts, records it in the memory (not shown in the drawing), and then proceeds to step S215. Incidentally, the initial template image Ts is a template image whose size will be changed as described later, but whose image content will not be updated.

In step S215, the control device 104 generates the same image as the initial template image Ts as a synthetic template image Tg and proceeds to step S216. Incidentally, the synthetic template image Tg, unlike the initial template image, is a template image whose image content will be updated. This update will be described later. Furthermore, the initial template image and the synthetic template image are tracking-use template images for identifying the tracked photographic subject position.

Figure 8:
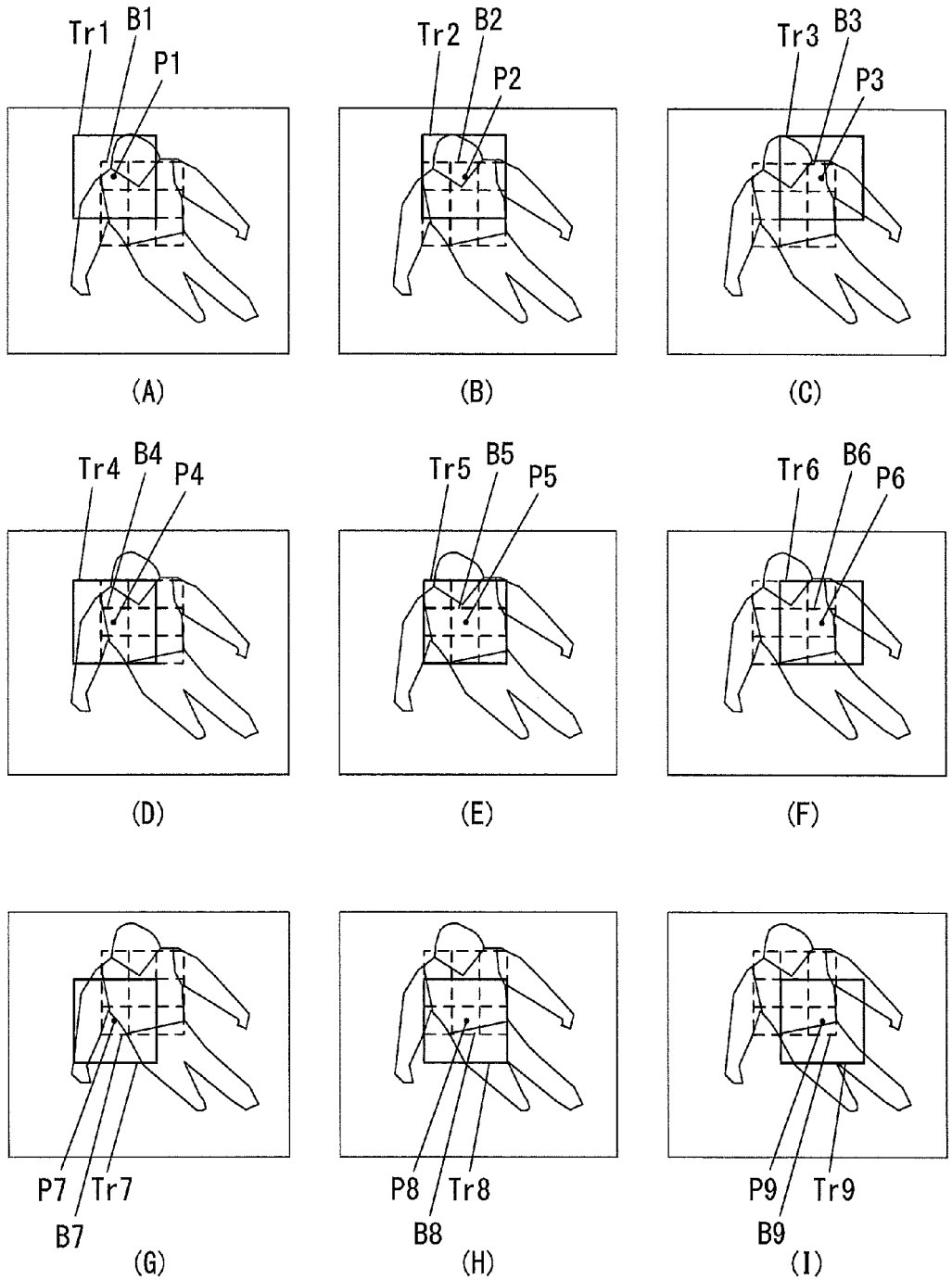
FIG. 8 shows diagrams explaining generation of the template images for resizing determination.

In step S216, the control device 104 generates resizing determination template images for judging whether to resize the template image or not. Specifically speaking, the control device 104 divides the synthetic template image Tg generated in step S215 into 3×3 blocks B1 to B9 as shown in FIG. 7(A) and calculates center positions P1 to P9 of the blocks B1 to B9, respectively. Then, the control device 104 generates an image of Objectsize×Objectsize, which is centered at the center position P1 of block B1, as a 1st resizing determination template image Tr1 as shown in FIG. 8(A). The same processing is executed with respect to the center positions P2 to P9 of blocks B2 to B9 and 2nd to 9th resizing determination template images Tr2 to Tr9 are generated as shown in FIG. 8(B) to (I). Incidentally, in this embodiment, the 5th resizing determination template image Tr5 which is centered at the center position (=the tracked photographic subject position) P5 of the center block B5, among the nine divided blocks, becomes the same image as the synthetic template image Tg.

Subsequently, the processing proceeds to step S217, where the control device 104 calculates distances L1 to L4 and L6 to L9 between the center positions P1 to P4 and P6 to P9 of the 1st to 4th and 6th to 9th resizing determination template images Tr1 to Tr4 and Tr6 to Tr9, respectively, and the center position P5 of the 5th resizing determination template image Tr5 (=the tracked photographic subject position) as shown in FIG. 7(B), as initial-state distances (initial distances). In this embodiment, for example, the Euclidean distance is used for calculation of the distances. The control device 104 records the calculated initial distances L1 to L4 and L6 to L9 in the memory (not shown in the drawing). Subsequently, the control device 104 terminates the processing in FIG. 4 and returns to the processing in FIG. 2.

On the other hand, if the control device 104 returns an affirmative judgment in step S212 described earlier and proceeds to step S218, the control device 104 calculates the reduction ratio Shuku of the frame image according to the following expression (7) and records it in the memory (not shown in the drawing).

$$\text{Shuku} = 24/\text{ObjectSize} \quad (7)$$

Then, the control device 104 resizes the frame image read in step S10 by using the above-mentioned reduction ratio Shuku and proceeds to step S219. In this embodiment, for example, a bilinear method is used as a method for resizing images. Furthermore, coordinates of the tracked photographic subject position are converted according to this resizing.

In step S219, the control device 104 generates an image of 24×24 pixels as an initial template image, which is centered at the above-mentioned tracked photographic subject position in the above-mentioned resized frame image, records it in the memory (not shown in the drawing), and then proceeds to step S220.

In step S220, the control device 104 generates the same image as the initial template image generated in step S219 as a synthetic template image and proceeds to step S221.

In step 221, the control device 104 divides the synthetic template image generated in step S220 into 3×3 blocks and calculates a center position of each block. Then, the control device 104 generates images of 24×24 pixel size, each of which is centered at the center position of the corresponding block, as 1st to 9th resizing determination template images in the same manner as in step S216 described above. Incidentally, the 5th resizing determination template image, which is centered at the center position of a center block (that is, the tracked photographic subject position) among the nine divided blocks is the same image as the synthetic template image generated in step S220.

Accordingly, in this embodiment, if the object size which was set earlier in step S211 is more than 24 pixels, the control device 104 generates template images of 24×24 pixels (the initial template image, the synthetic template image, and the 1st to 9th resizing determination template images) in the resized frame image. Incidentally, the reduction ratio Shuku of the frame image is calculated in step S218 above so that the image content of these template images of 24×24 pixels will become the same as that in the case where the template images having the size of Objectsize×Objectsize are generated in the original (pre-resizing) frame image. Then, for tracked photographic subject position identification processing (FIG. 8) to be described later, template matching processing is executed on the resized frame image by using the template images of 24×24 pixels. As a result, even if the size of the template image that can be treated by the template matching processing is limited to a maximum of 24×24 pixels, a photographic subject of a size larger than 24×24 pixels in the original frame image can be tracked.

Subsequently, the processing proceeds to step S222, where the control device 104 calculates the distances between the center positions of the 1st to 4th and 6th to 9th resizing determination template images, respectively, and the center position of the 5th resizing determination template image as initial distances. The control device 104 records the calculated distances in the memory (not shown in the drawing). Then, the control device 104 terminates the processing in FIG. 4 and returns to the processing in FIG. 2.

After completing the template image generation processing in step S20 of FIG. 2 as described above, the control device 104 proceeds to step S30 and sets a search area for the template matching processing on a second frame. Now, the control device 104 sets an area, which is centered at the above-mentioned tracked photographic subject position and whose size is determined based on the size of the template image (Tempsize), as a search area. Specifically speaking, a y-coordinate of an upper end (TM_Ystart), a y-coordinate of a lower end (TM_Yend), an x-coordinate of a left end (TM_Xstart), and a y-coordinate of a right end (TM_Xend) of the search area are calculated according to the following expressions (8) to (15). Incidentally, regarding the following expressions (8) to (15), TM_ImageWidth represents a value obtained by multiplying the width of the frame image by the above-mentioned reduction ratio; ObjectY represents the y-coordinate of the tracked photographic subject position; ObjectX represents the x-coordinate of the tracked photographic subject position; MinZansa=0.1 and Keisu=0.5. Furthermore, if Objectsize is 24 pixels or less in the following expressions (12) to (15), Tempsize is equal to Objectsize (Tempsize=Objectsize); and if Objectsize is more than 24 pixels, Tempsize is 24 (Tempsize=24). Furthermore, if Objectsize is more than 24 pixels in the following expressions (12) to (15), converted coordinates according to resizing in step S218 are used for ObjectX and ObjectY.

$$Search = TM\_ImageWidth \times Keisu \qquad (8)$$

$$If(ObjectSize >= 60) \rightarrow Geta = 50$$

$$else\ Geta = 24 \qquad (9)$$

$$Geta1 = Geta \times Shuku \qquad (10)$$

$$SearchWidth = Minzansa \times Search + Geta1 \qquad (11)$$

$$TM\_Ystart = ObjectY - (SearchWidth + 1) - TempSize/2 \qquad (12)$$

$$TM\_Yend = ObjectY + SearchWidth + TempSize/2 \qquad (13)$$

$$TM\_Xstart = ObjectX - (SearchWidth + 1) - TempSize/2 \qquad (14)$$

$$TM\_Xend = ObjectX + SearchWidth + TempSize/2 \qquad (15)$$

Then, the processing proceeds to step S40, where the control device 104 reads a frame image (an image of a second or subsequent frame) input from the image sensor 103; and then proceeds to step S50. When this happens, the control device 104 converts the frame image represented by the RGB colorimetric system into a luminance image (Y image) and color difference images (Cb and Cr) in the same manner as in step S10 described earlier.

In step S50, the control device 104 executes the tracked photographic subject position identification processing. Now, the details of the tracked photographic subject position identification processing will be explained using FIG. 9. In step S501 of FIG. 9, the control device 104 resizes the frame image, which was read in step S40, according to the reduction ratio Shuku which was set in step S213 or S218 describe earlier, or in step S810 or S815 described later and then proceeds to step S502.

In step S502, the control device 104 calculates the degree of similarity between the initial template image and an image in the search area and the degree of similarity between the synthetic template image and an image in the search area, respectively, in the frame image resized in step S501. Under this circumstance, a sum of absolute difference (SAD) is used as a method for calculating the degree of similarity. The sum of absolute difference indicates the following: the smaller a value of the sum of absolute difference is, the higher the degree of similarity is; and the larger the value of the sum of absolute difference is, the lower the degree of similarity is.

Specifically speaking, the control device 104 calculates a sum of absolute difference between an image in a search frame, which is of the same size as that of the initial template image, and the initial template image with respect to each of the Y component, the Cb component, and the Cr component, and shifts the search frame in the search area by one pixel to again calculate a sum of absolute difference. Similarly regarding the synthetic template image, the control device 104 also calculates sums of absolute differences between an image in the search frame and the synthetic template image by moving the search frame from one pixel to another. Then, the control device 104 generates a similarity degree map, which represents the sums of absolute differences at each search frame position two-dimensionally, for each of the Y component, the Cb component, and the Cr component with respect to the initial template image and the synthetic template image, respectively.

Then, the processing proceeds to step S503, where the control device 104 judges whether the frame image read in step S40 is the second frame or not. If it is the second frame, the control device 104 proceeds to step S505; and if it is a third or subsequent frame, the control device 104 proceeds to step S504.

In step S504, the control device 104 performs multiplication in each similarity degree map generated in step S502 by a coefficient Kyori corresponding to the distance from the tracked photographic subject position identified by the tracked photographic subject position identification processing for the previous frame; and then proceeds to step S505. Incidentally, this coefficient Kyori is calculated according to the following expression (16). Specifically speaking, this coefficient is calculated so that it becomes larger as the distance from the tracked photographic subject position for the previous frame becomes larger.

$$\text{Kyori}(x,y)=\text{Kyori}_0+K(|x-Mx\times\text{Shuku}|+|y-My\times\text{Shuku}|) \quad (16)$$

Incidentally, regarding expression (16), (x,y) represents coordinates of each pixel in the search area; Mx represents the x-coordinate of the tracked photographic subject position identified for the previous frame; and My represents the y-coordinate of the tracked photographic subject position identified for the previous frame. Furthermore, in this embodiment, $\text{Kyori}_0=1.0$ and $K=0.05$.

In step S505, the control device 104 integrates or combines the similarity degree maps SADY, SADCb, and SADCr of the Y component, the Cb component, and the Cr component with respect to the initial template image and with respect to the synthetic template image according to the following expression (17) and thereby generates a combined similarity degree map SADall.

$$\text{SADall}=1/N(\text{Gain}Y\times\text{SAD}Y+\text{Gain}Cb\times\text{SAD}Cb+\text{Gain}Cr\times\text{SAD}Cb) \quad (17)$$

Incidentally, regarding expression (17), GainY=0.1, GainCb=1.5, and GainCr=1.5 in this embodiment. Furthermore, N represents a normalizing coefficient of SAD and is expressed as follows: N=Tempsize×Tempsize×255.

Then, the control device 104 selects a search frame position, at which a maximum degree of similarity (that is, a minimum sum of absolute difference) is calculated, as a matching position from the combined similarity degree map of the initial template image and the combined similarity degree map of the synthetic template image. The control device 104 identifies an area in the search frame (matching area) at the matching position as a tracked photographic subject area and also identifies a center position of the tracked photographic subject area as a tracked photographic subject position.

Specifically speaking, the control device 104 calculates coordinates (Objx, Objy) of the tracked photographic subject position according to the following expressions (18) and (19) so as to identify the tracked photographic subject position.

$$\text{Obj}x=Mx+\text{Tempsize}/2 \quad (18)$$

$$\text{Obj}y=My+\text{Tempsize}/2 \quad (19)$$

Furthermore, the control device 104 calculates a y-coordinate of an upper end (Obj_YStart), a y-coordinate of a lower end (Obj_YEnd), an x-coordinate of a left end (Obj_XStart), and an x-coordinate of a right end (Obj_XEnd) of the tracked photographic subject area according to the following expressions (20) to (23) and thereby identifies the tracked photographic subject area.

$$\text{Obj\_YStart}=My/\text{Shuku} \quad (20)$$

$$\text{Obj\_YEnd}=(My+\text{Tempsize}-1)/\text{Shuku} \quad (21)$$

$$\text{Obj\_XStart}=Mx/\text{Shuku} \quad (22)$$

$$\text{Obj\_XEnd}=(Mx+\text{Tempsize}-1)/\text{Shuku} \quad (23)$$

Figure 9:
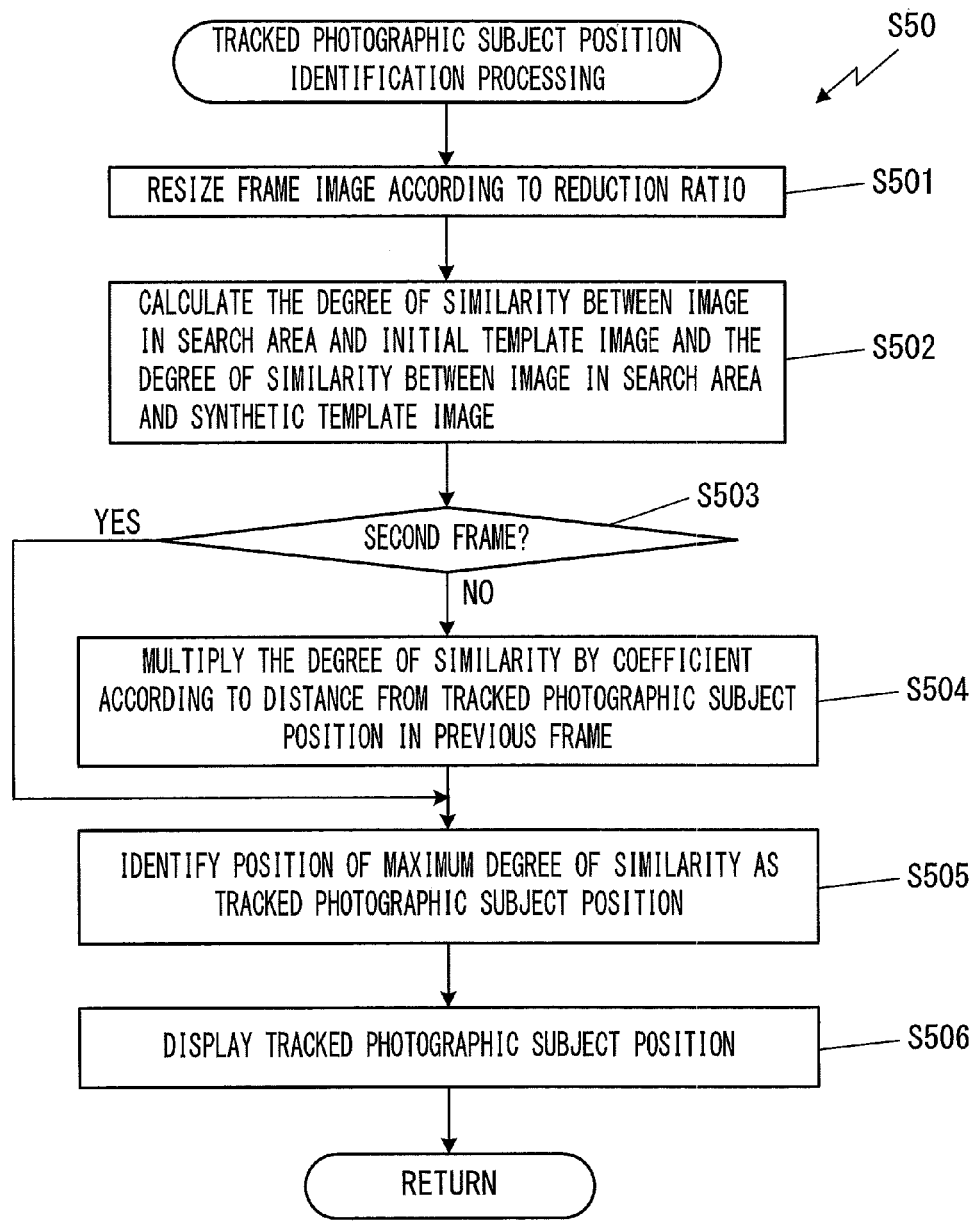
FIG. 9 shows a flowchart illustrating the details of tracked photographic subject position identification processing.

Then, the processing proceeds to step S506, where the control device 104 displays the above-mentioned tracked photographic subject area and the tracked photographic subject position in the frame image displayed on the monitor 106, terminates the processing in FIG. 9, and returns to the processing in FIG. 2.

After completing the tracked photographic subject position identification processing in step S50 of FIG. 2 as described above, the control device 104 proceeds to step S60 and judges whether the frame image read in step S40 is a last frame or not. If it is the last frame, the control device 104 returns an affirmative judgment in step S60 and terminates the processing in FIG. 2; and if it is not the last frame, the control device 104 returns a negative judgment in step S60 and proceeds to step S70.

Figure 10:
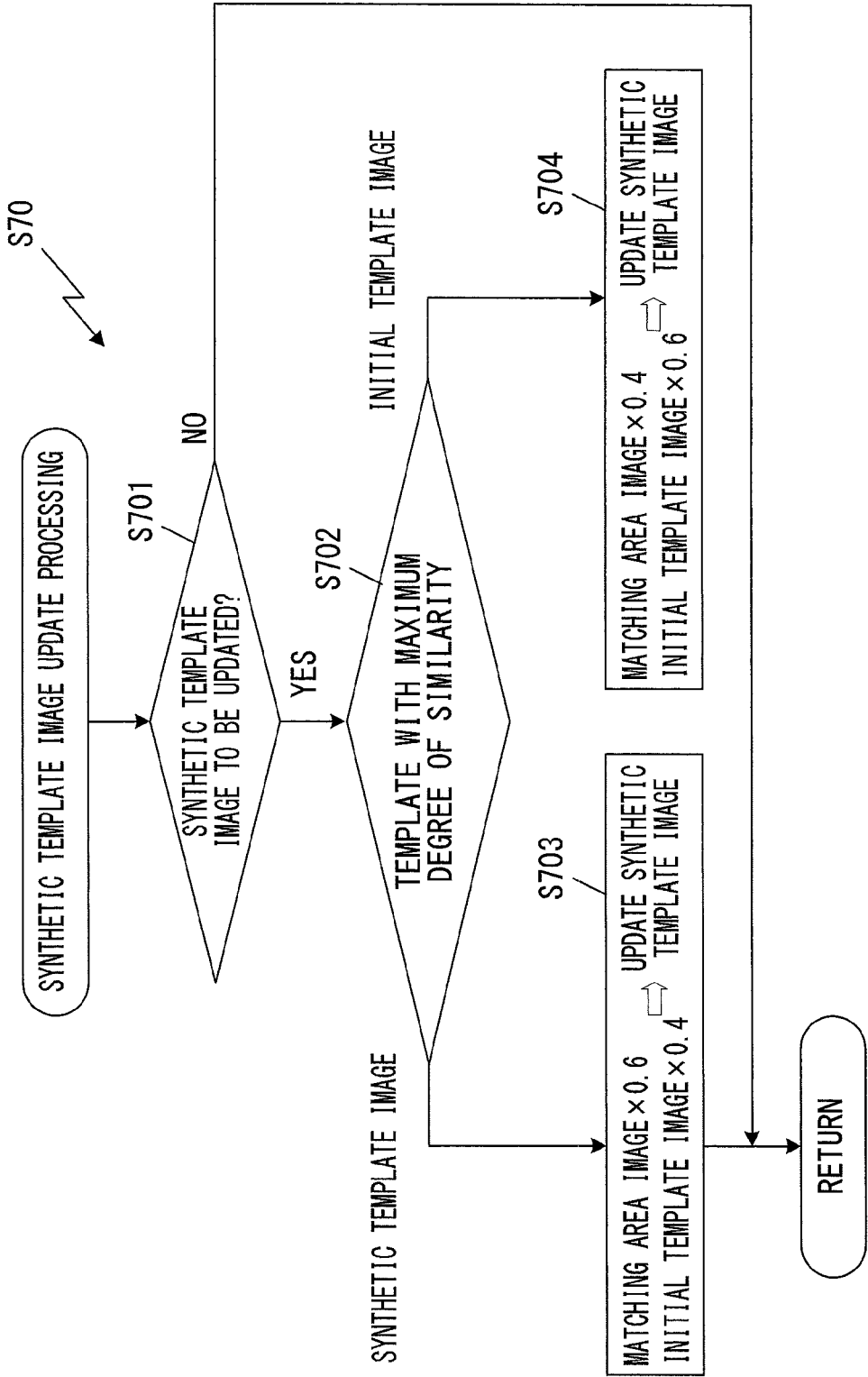
FIG. 10 shows a flowchart illustrating the details of synthetic template image update processing.

In step S70, the control device 104 executes synthetic template image update processing. Now, the details of the synthetic template image update processing will be explained using FIG. 10. In step S701 of FIG. 10, the control device 104 judges whether to update the synthetic template image or not. When this happens, if the following condition (1) and condition (2) are satisfied, the control device 104 determines that update conditions for the synthetic template image are satisfied.

Condition (1): the aforementioned minimum sum of absolute difference is less than a preset determination threshold (that is, the maximum degree of similarity is equal to or more than a predetermined value); and Condition (2): the maximum degree of similarity is calculated from the similarity degree map generated from the same template image consecutively for a specified number of times or more (for example, 3 times or more).

Then, if the control device 104 determines that the aforementioned update conditions are satisfied, it returns an affirmative judgment in step S701 and proceeds to step S702. On the other hand, if the control device 104 determines that the aforementioned update conditions are not satisfied, it returns to a negative judgment in step S701, terminates the processing in FIG. 10 without updating the synthetic template image, and returns to the processing in FIG. 2. If the aforementioned update conditions are not satisfied, it is highly likely that the photographic subject which is the tracking target is not captured and the synthetic template image to be updated may include a photographic subject which is different from the original tracking target.

In step S702, the control device 104 judges whether the maximum degree of similarity is calculated based on the similarity degree map of the initial template image or the similarity degree map of the synthetic template image. If the control device 104 determines that the maximum degree of similarity is calculated based on the similarity degree map of the synthetic template image, it proceeds to step S703; and if the control device 104 determines that the maximum degree of similarity is calculated based on the similarity degree map of the initial template image, it proceeds to step S704.

In step S703, the control device 104 generates a new synthetic template image by adding pixel information of the image in the matching area as multiplied by a first weighting coefficient and pixel information of the initial template image as multiplied by a second weighting coefficient, that is, by synthesizing these pieces of pixel information. The control device 104 sets this generated image as a new, updated synthetic template image, terminates the processing in FIG. 10, and returns to the processing in FIG. 2.

Since both the image in the matching area and the initial template image are data cut out from the photographic subject to be tracked under this circumstance, their information content is not completely different. Therefore, if these two images are synthesized, an image similar to the photographic subject which is the tracking target will be generated. The advantage of using this synthesized image as the new synthetic template image is that, for example, even if the photographic subject moves strenuously and the photographic subject changes to some extent, the photographic subject can still be tracked robustly by using the synthetic template image including a plurality of pieces of photographic subject information. Incidentally, the first weighting coefficient and the second weighting coefficient are set so that their sum becomes 1; and the respective values of the weighting coefficients are, for example, the first weighting coefficient=0.6 and the second weighting coefficient=0.4. Specifically speaking, if the maximum degree of similarity is calculated based on the synthetic template image, it is highly likely that the shape of the current photographic subject has changed significantly from the shape of the photographic subject in the initial template image. So, it is possible to generate a new synthetic template image in which the shape of the current photographic subject is reflected immensely, by setting a large value as the first weighting coefficient to multiply the pixel information of the synthetic template image. Furthermore, even in this case, it is possible to prevent the new updated template image from deviating immensely from the initial template image by setting a small value as the second weighting coefficient, multiplying the pixel information of the initial template image by such second weighting coefficient, and adding the obtained pixel information.

On the other hand, in step S704, the control device 104 generates a new synthetic template image by adding pixel information of the image in the matching area as multiplied by a third weighting coefficient and pixel information of the initial template image as multiplied by a fourth weighting coefficient, that is, by synthesizing these pieces of pixel information. The control device 104 sets this generated image as the new, updated synthetic template image, terminates the processing in FIG. 10, and returns to the processing in FIG. 2.

In this case, the third weighting coefficient and the fourth weighting coefficient are set so that their sum becomes 1; and the respective values of the weighting coefficients are, for example, the third weighting coefficient=0.4 and the fourth weighting coefficient=0.6. Specifically speaking, if the maximum degree of similarity is calculated based on the similarity degree map of the initial template image, it is not likely that the shape of the current photographic subject has changed significantly from the shape of the photographic subject in the initial template image. So, the newly generated synthetic template image is made closer to the initial template image by setting a large value as the fourth weighting coefficient to multiply the pixel information of the initial template image. Also, even in this case, a new synthetic template image, in which an influence of changes in the shape of the photographic subject along with the elapse of time is reflected, can be generated by setting a small value as the third weighting coefficient, multiplying the pixel information of the synthetic template image by such third weighting coefficient, and adding the obtained pixel information.

Figure 11:
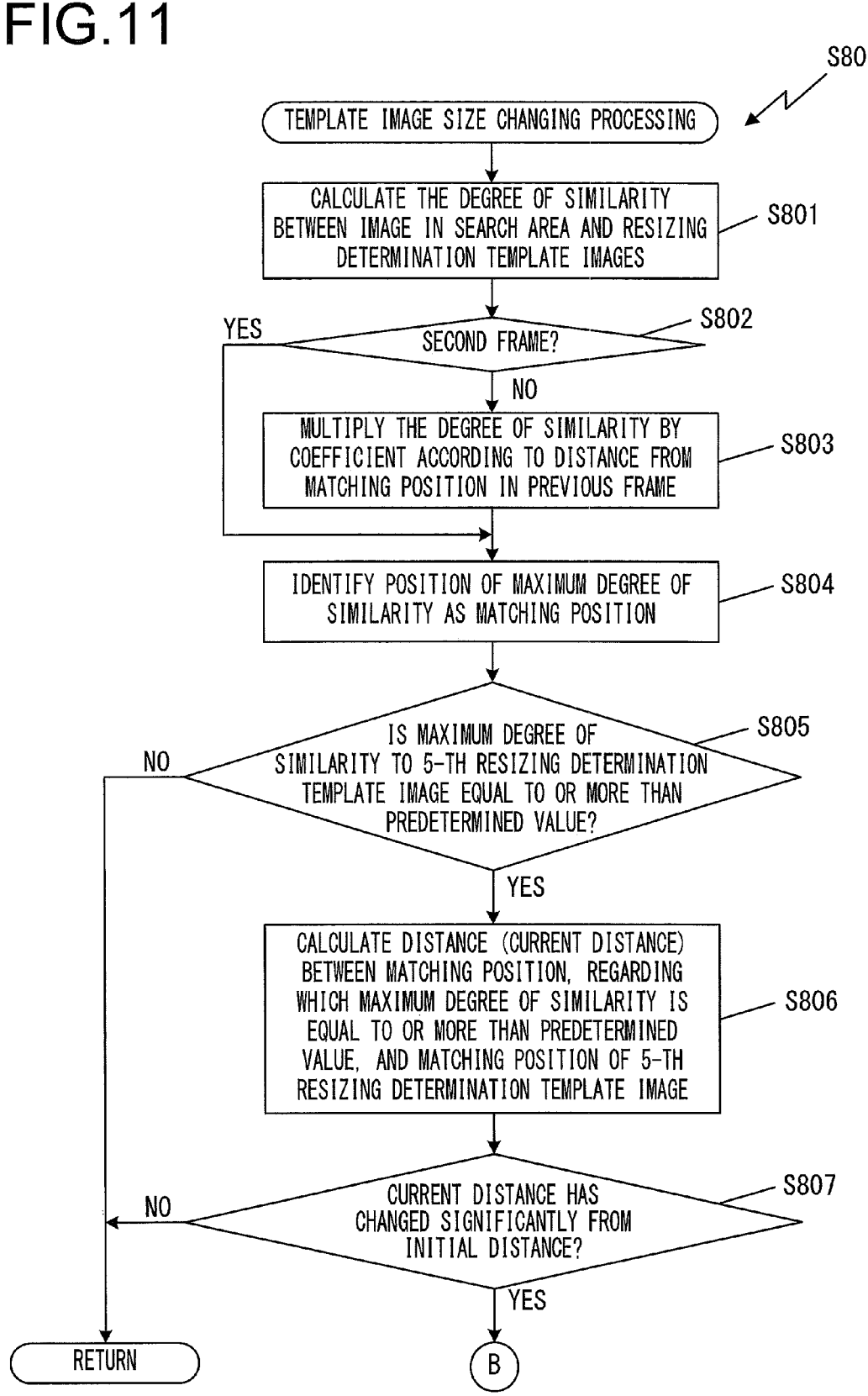
FIG. 11 shows a flowchart illustrating the details of template size update processing.

After completing the synthetic template image update processing in step S70 as described above, the control device 104 proceeds to step S80 and executes template image size changing processing. Now, the details of the template image size changing processing will be explained using FIG. 11 and FIG. 12. In step S801 of FIG. 11, the control device 104 calculates the degree of similarity between an image in the search area and the 1st to 9th resizing determination template images, respectively, in the same manner as in the case of the initial template image and the synthetic template image as described earlier in step S502. Then, the control device 104 generates a similarity degree map for each of the Y component, the Cb component, and the Cr component with respect to each of the 1st to 9th resizing determination template images.

Then, the processing proceeds to step S802, where the control device 104 judges whether the frame image read in step S40 is the second frame or not. If it is the second frame, the control device 104 proceeds to step S804; and if it is a third or subsequent frame, the control device 104 proceeds to step S803.

In step S803, the control device 104 calculates the coefficient Kyori using the aforementioned expression (16) in the same manner as in step S504 mentioned earlier. Incidentally, regarding Mx and My in the aforementioned expression (16), coordinates of the matching position identified by the template image size changing processing in the previous frame are used with respect to each of the 1st to 9th resizing determination template images. Then, the control device 104 performs multiplication in each similarity degree map generated in step S801 by the coefficient Kyori and proceeds to step S804.

In step S804, the control device 104 integrates or combines the similarity degree maps of the Y component, the Cb component, and the Cr component with respect to each of the 1st to 9th resizing determination template images according to the aforementioned expression (17) in the same manner as in step S505 described earlier and thereby generates a combined similarity degree map. Then, the control device 104 identifies a search frame position, at which a maximum degree of similarity (that is, a minimum sum of absolute difference) is calculated, as a matching position with respect to the similarity degree map of each of the 1st to 9th resizing determination template images and proceeds to step S805. Specifically speaking, the control device 104 identifies the matching position for each of the 1st to 9th resizing determination template images.

In step S805, the control device 104 judges whether the minimum sum of absolute difference of the combined similarity degree map based on the 5th resizing determination template image is less than a preset determination threshold (that is, the maximum degree of similarity is equal to or more than a predetermined value) or not. If the above-mentioned minimum sum of absolute difference is less than the above-mentioned determination threshold, the control device 104 returns an affirmative judgment in step S805 and proceeds to step S806. On the other hand, if the above-mentioned minimum sum of absolute difference is equal to or more than the above-mentioned determination threshold (that is, the maximum degree of similarity is less than the predetermined value), the control device 104 returns a negative judgment in step S805, terminates the processing in FIG. 11 without changing the size of the template image, and returns to the processing in FIG. 2.

In step S806, the control device 104 selects a resizing determination template image(s), whose minimum sum of absolute difference is less than the preset determination threshold (that is, whose maximum degree of similarity is equal to or more than the predetermined value), from the 1st to 4th and the 6th to 9th resizing determination template images. Then, the control device 104 calculates the distance (current distance) between the matching position of each selected resizing determination template image and the matching position of the 5th resizing determination template image (=the matching position of the synthetic template image) and proceeds to step S807.

Figure 13:
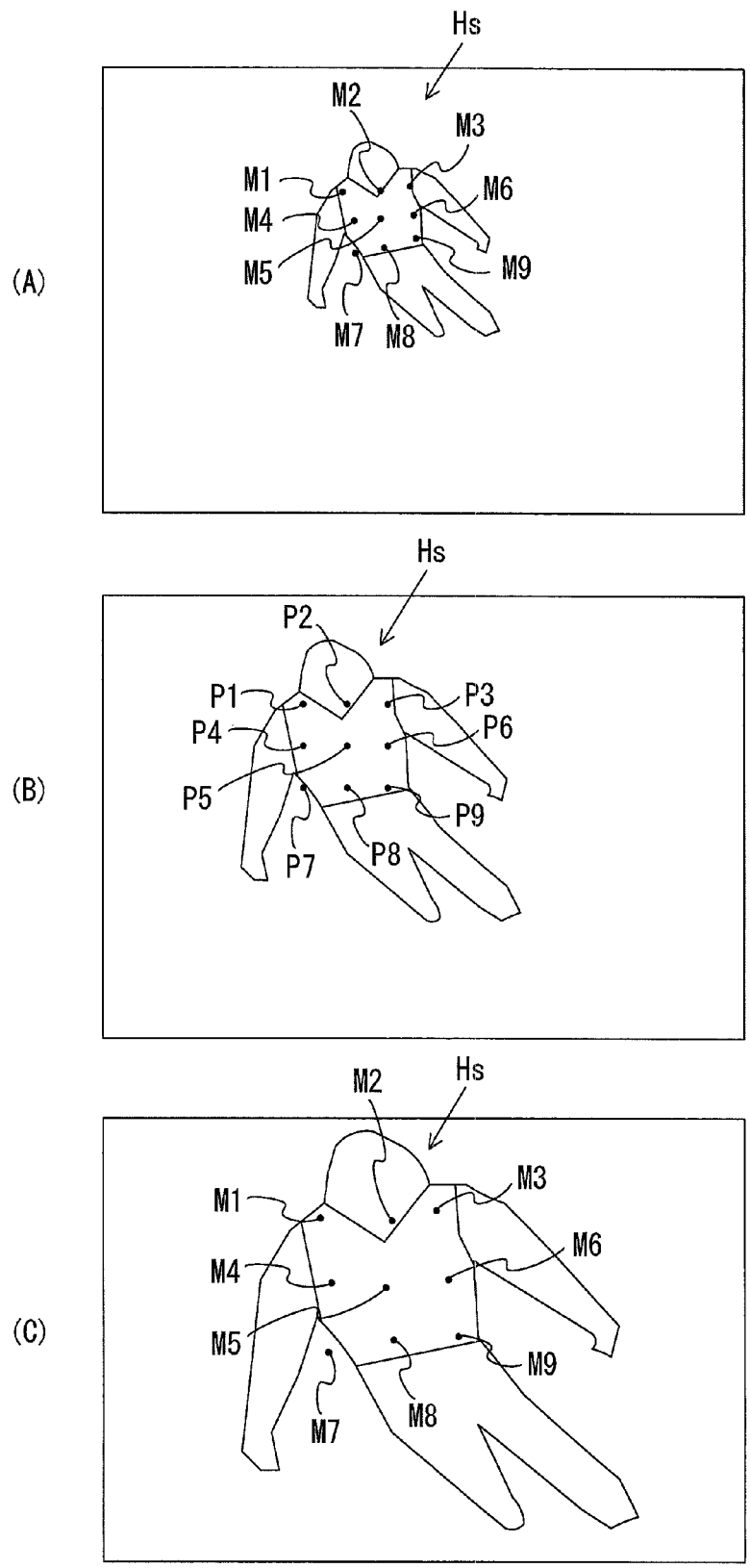
FIG. 13 shows diagrams explaining the relationship between matching positions of resizing determination template images and the size of a photographic subject.

Now, the relationship between the matching positions M1 to M9 of the 1st to 9th resizing determination template images and the size of the tracked photographic subject Hs will be explained using FIG. 13. FIG. 13(B) shows a diagram explaining the initial distance, that is, the distance between each of center positions P1 to P4 and P6 to P9 of the 1st to 4th and the 6th to 9th resizing determination template images and a center position P5 of the 5th resizing determination template image.

When the state shown in FIG. 13(B) changes to the state shown in FIG. 13(A), that is, when the tracked photographic subject Hs in the frame image becomes smaller, the density becomes higher than that in the case shown in FIG. 13(B) regarding the positional relationship of the matching positions M1 to M9 of the 1st to 5th resizing determination template images. Specifically speaking, the distance (current distance) between each of the matching positions M1 to M4 and M6 to M9 of the 1st to 4th and the 6th to 9th resizing determination template images and the matching position M5 of the 5th resizing determination template image becomes shorter than each corresponding initial distance. Furthermore, the current distance becomes shorter than the initial distance as the tracked photographic subject Hs becomes smaller.

When the state shown in FIG. 13(B) changes to the state shown in FIG. 13(C), that is, when the tracked photographic subject Hs in the frame image becomes larger, the density becomes lower (sparse) than that in the case shown in FIG. 13(B) regarding the positional relationship of the matching positions M1 to M9 of the 1st to 5th resizing determination template images. Specifically speaking, the distance (current distance) between each of the matching positions M1 to M4 and M6 to M9 of the 1st to 4th and the 6th to 9th resizing determination template images and the matching position M5 of the 5th resizing determination template image becomes longer than each corresponding initial distance. Furthermore, the current distance becomes longer than the initial distance as the tracked photographic subject Hs becomes larger.

Incidentally, when the size of the tracked photographic subject Hs does not change, the distance between each of the matching positions M1 to M4 and M6 to M9 of the 1st to 4th and the 6th to 9th resizing determination template images and the matching position M5 of the 5th resizing determination template image does not change from each corresponding initial distance so much.

So, in step S807, the control device 104 judges whether or not the distance calculated in step S806 (hereinafter referred to as the "current distance") has changed significantly from the initial distance calculated in step S217 or step S222 described earlier, or in step S814 or step S819 to be described later. Specifically speaking, if conditions described as Current Distance/Initial Distance≥1.2 or Current Distance/Initial Distance≤0.76 are satisfied with a majority of the current distances calculated in step S806, it is determined that the current distance has changed significantly from the initial distance; and in other cases, it is determined that the current distance has not changed so much from the initial distance. If the current distance has changed significantly from the initial distance, it is highly likely that the size of the tracked photographic subject has changed significantly. Therefore, if the control device 104 determines that such change is large, it returns an affirmative judgment in step S807 and proceeds to step S808. On the other hand, the control device 104 determines that such change is small, it returns a negative judgment in step S807, terminates the processing in FIG. 11 without changing the size of the template image, and returns to the processing in FIG. 2.

Figure 12:
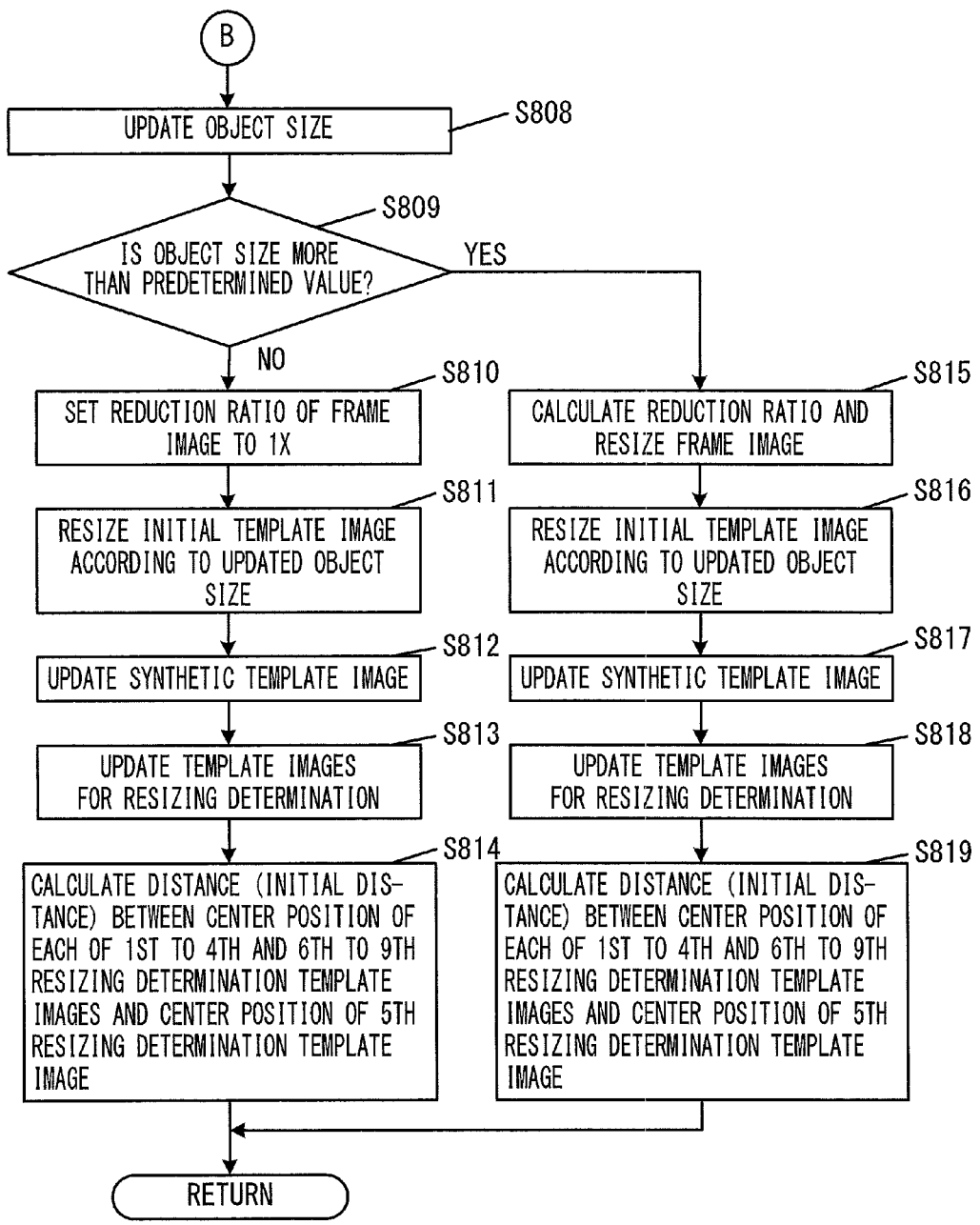
FIG. 12 shows a flowchart that follows FIG. 11.

In step S808 of FIG. 12, if the current distance becomes longer than the initial distance, the control device 104 increases the object size; and if the current distance becomes shorter than the initial distance, the control device 104 reduces the object size. Furthermore, the control device 104 sets a greater amount of the size change as the object size before the change is larger; and the control device 104 sets a smaller amount of size change as the object size before the change is smaller. Specifically speaking, in a case of Current Distance/Initial Distance≥1.2, the object size (Objectsize) is updated by using the following expression (24); and in a case of Current Distance/Initial Distance≤0.76, the object size (Objectsize) is updated by using the following expression (25).

(1) In the case of Current Distance/Initial Distance≥1.2

If(ObjectSize≥240)→ObjectSize=240 elseif(ObjectSize≥120)→ObjectSize=ObjectSize+15 elseif(ObjectSize≥60)→ObjectSize=ObjectSize+12 elseif(ObjectSize≥48)→ObjectSize=ObjectSize+9 elseif(ObjectSize≥27)→ObjectSize=ObjectSize+6 else→ObjectSize=ObjectSize+3      (24)

(2) In the case of Current Distance/Initial Distance≤0.76

If(ObjectSize≥105)→ObjectSize=ObjectSize−15 elseif(ObjectSize≥72)→ObjectSize=ObjectSize−12 elseif(ObjectSize≥33)→ObjectSize=ObjectSize−9 elseif(ObjectSize≥24)→ObjectSize=ObjectSize−6 elseif(ObjectSize≤6)→ObjectSize=6 else→ObjectSize=ObjectSize−3      (25)

Then, the processing proceeds to step S809, where the control device 104 judges whether the object size updated in step S808 is more than a predetermined value (24 pixels in this embodiment) or not. If the object size is more than the predetermined value, the control device 104 returns an affirmative judgment in step S809 and proceeds to step S815. On the other hand, if the object size is equal to or less than the predetermined value, the control device 104 returns a negative judgment in step S809 and proceeds to step S810.

In step S810, the control device 104 sets the reduction ratio Shuku of the frame image to x1 and proceeds to step S811.

In step S811, the control device 104 resizes the initial template image recorded in the memory (not shown in the drawing) in step S214 or S219 by using an inverse number of the reduction ratio Shuku stored in the memory (not shown in the drawing) in step S213 or S218. Then, the control device 104 resizes this resized initial template image so that it becomes the object size Objectsize×Objectsize updated in step S808; and then proceeds to step S812.

In step S812, the control device 104 updates an image, which is centered at the tracked photographic subject position identified in step S50 and whose size is the object size Objectsize×Objectsize updated in step S808, in the frame image read in step S40 as a synthetic template image and proceeds to step S813.

In step S813, the control device 104 divides the synthetic template image generated in step S813 into 3×3 blocks and calculates a center position of each block. Then, the control device 104 updates images, each of which is centered at the center position of each block and whose size is the object size Objectsize×Objectsize updated in step S808, as 1st to 9th resizing determination template images in the same manner as in step S216 described earlier.

Accordingly, in steps S811 to S813 described above, if the current distance becomes longer than the initial distance, the control device 104 increases the size of the template image; and if the current distance becomes shorter than the initial distance, the control device 104 reduces the size of the template image.

Then, the processing proceeds to step S814, where the control device 104 calculates the distance between the center position of each of the 1st to 4th and the 6th to 9th resizing determination template images updated in step 813 and the center position of the 5th resizing determination template image, as the initial distance. The control device 104 records the calculated distances in the memory (not shown in the drawing). Subsequently, the control device 104 terminates the processing in FIG. 12 and returns to the processing in FIG. 2.

On the other hand, if the control device 104 returns an affirmative judgment in step S809 described earlier, it proceeds to step S815, where the control device 104 calculates the reduction ratio Shuku of the frame image according to the aforementioned expression (7) by using the object size Objectsize updated in step S808 described earlier. Then, the control device 104 resizes the frame image read in step S40 by using the calculated reduction ratio Shuku and proceeds to step S816. Incidentally, the control device 104 converts the coordinates of the tracked photographic subject position identified in step S50 according to this resizing.

In step S816, the control device 104 resizes the initial template image recorded in the memory (not shown in the drawing) in step S214 or S219 by using the inverse number of the reduction ratio Shuku recorded in the memory (not shown in the drawing) in step S213 or S218. Then, the control device 104 resizes this resized initial template image so that it becomes the object size Objectsize×Objectsize updated in step S808. Furthermore, the control device 104 changes the size of the initial template image to 24×24 pixels by resizing this resized initial template image by using the reduction ratio Shuku calculated in step S815 described above; and then proceeds to step S817.

In step S817, the control device 104 updates an image, which is centered at the above-mentioned tracked photographic subject position and whose size is 24×24 pixels, in the frame image resized in step S815 as a synthetic template image and then proceeds to step S818.

In step 818, the control device 104 divides the synthetic template image generated in step S817 into 3×3 blocks and calculates a center position of each block. Then, the control device 104 updates the images, each of which is centered at the center position of each block and whose size is 24×24 pixels, as new 1st to 9th resizing determination template images in the same manner as in step S221 described earlier.

Accordingly, in steps S815 to S818 where the object size updated in the aforementioned step S809 is more than 24 pixels, if the current distance becomes longer than the initial distance, the control device 104 increases the size of the template image relative to the frame image; and if the current distance becomes shorter than the initial distance, the control device 104 reduces the size of the template image relative to the frame image. Incidentally, the expression "changing the size of the template image" used in this description includes to change a multiplying factor or ratio of the size of the template image relative to the size of the frame image.

Then, the processing proceeds to step S819, where the control device 104 calculates the distance between the center position of each of the 1st to 4th and the 6th to 9th resizing determination template images updated in step S818 and the center position of the 5-th resizing determination template image as the initial distance. The control device 104 records the calculated distances in the memory (not shown in the drawing). Subsequently, the control device 104 terminates the processing in FIG. 12 and returns to the processing in FIG. 2.

After completing the template size changing processing in step S80 of FIG. 2 as described above, the control device 104 proceeds to step S90 and sets a search area for the template matching processing on a next frame. Now, the control device 104 sets an area, which is centered at the above-mentioned tracked photographic subject position and whose size is determined based on the template size and the minimum sum of absolute difference (that is, the maximum degree of similarity) calculated in step S505, as the search area. Specifically speaking, the control device 104 calculates the y-coordinate of the upper end (TM_Ystart), the y-coordinate of the lower end (TM_Yend), the x-coordinate of the left end (TM_Xstart), and the y-coordinate of the right end (TM_Xend) of the search area by using the aforementioned expressions (8) to (15) in the same manner as in step S30. Incidentally, in the aforementioned expression (11), the minimum sum of absolute difference calculated in step S505 is used as MinZansa.

When the search area in the next frame is set in this way, the control device 104 returns to step S40. The control device 104 tracks the photographic subject, which is the tracking target, in frame images read successively by repeating steps S40 to S90.

The following operational advantages can be obtained according to the embodiment described above.

(1) The photographic subject tracking device comprises: the control device 104 that sets the search area in the input image (frame image); the control device 104 that calculates the degree of similarity between the template images for tracking (the initial template image and the synthetic template image) and the image in the search area; the control device 104 that identifies the tracked photographic subject position in the frame image based on the calculated degree of similarity; the control device 104 that calculates the degree of similarity between each of the 1st to 9th resizing determination template images generated based on the synthetic template image and a relevant image in the search area; the control device 104 that identifies the matching position of each of the 1st to 9th resizing determination template images in the frame image based on the calculated degree of similarity; and the control device 104 that changes the image size of the templates images for tracking and the resizing determination template images based on density or degree of sparseness (that is, the degree of changes from the above-mentioned initial distance with respect to the above-mentioned current distance) of the above-identified matching positions. So, the size of the template images can be changed according to changes of the size of the tracked photographic subject. Therefore, the photographic subject whose size is variable can be tracked with excellent precision.

(2) The photographic subject tracking device described in (1) above is configured so that if the density of the plurality of matching positions identified above has changed by a predetermined amount or more (Current Distance/Initial Distance≥1.2 or Current Distance/Initial Distance≤0.76), the size of the template image will be changed. So, it is possible to prevent the size of the template image from being mistakenly changed by a significant amount when the size of the tracked photographic subject has not changed so much.

(3) The photographic subject tracking device described in (1) or (2) above is configured so that if the density of the above-identified matching positions has changed to a higher value (that is, if the above-mentioned current distance becomes shorter than the above-mentioned initial distance), the control device 104 reduces the size of the template image; and if the density of the plurality of matching positions identified above has changed to a lower value (that is, if the above-mentioned current distance becomes longer than the above-mentioned initial distance), the control device 104 increases the size of the template image. So, if the size of the tracked photographic subject has becomes smaller, the size of the template image can be reduced; and if the size of the tracked photographic subject has become larger, the size of the template image can be increased.

(4) The photographic subject tracking device described in (1) to (3) above is configured so that the control device 104 selects a matching position, whose minimum sum of absolute difference is less than the above-mentioned determination threshold, that is, a matching position whose degree of similarity is equal to or more than the predetermined value, from among the matching positions identified above and changes the above-mentioned image size based on the density of the selected matching position. So, the size of the template image can be changed based on only the matching position regarding which the tracked photographic subject is successfully captured and tracked. Therefore, it is possible to prevent inappropriate changes of the size of the template image.

(5) The photographic subject tracking device described in (1) to (4) above is configured so that each of the 1st to 9th resizing determination template images is an image including a different part of the template image for tracking (the synthetic template image). So, whether the size of the tracked photographic subject has changed or not can be identified with excellent precision by using the 1st to 9th resizing determination template images.

(6) The photographic subject tracking device described in (5) above is configured so that each of the 1st to 9th resizing determination template images is an image of a predetermined size, which is centered at the center position of each block B1 to B9, in the template image for tracking (the synthetic template image) divided into 3×3 blocks. So, whether the size of the tracked photographic subject has changed or not can be identified with excellent precision by using the 1st to 9th resizing determination template images.

(7) The photographic subject tracking device described in (6) above is configured so that the control device 104 changes the size of the template image based on the density of the matching positions of the (1st to 4th and 6th to 9th) resizing determination template images other than the 5th resizing determination template image with reference to the matching position of the 5th resizing determination template image which is centered at the center position P5 of the center block B5 in the above-mentioned 3×3 blocks. So, changes of the size of the tracked photographic subject can be followed with excellent precision.

(8) The photographic subject tracking device described in (7) above is configured so that the control device 104 changes the size of the template image when the maximum degree of similarity between the 5th resizing determination template image and an image in the search area is equal to or more than the predetermined value. So, the size of the template image can be changed based on the density with reference to the matching position regarding which the tracked photographic subject is successfully and reliably captured and tracked. Therefore, it is possible to prevent inappropriate changes of the size of the template image.

(9) The photographic subject tracking device comprises: the control device 104 that sets the search area in the input image (frame image); the control device 104 that calculates the degree of similarity between the initial template image and the image in the search area and the degree of similarity between the synthetic template image and the image in the search area; the control device 104 that identifies the tracked photographic subject position in the frame image based on the calculated degrees of similarity; the control device 104 that judges whether or not to update the synthetic template image based on the calculated degrees of similarity; the control device 104 that updates an image, which is obtained by synthesizing an image including the tracked photographic subject position in the input image and the initial template image, as a new synthetic template image when the control device 104 determines to update the synthetic template image; the control device 104 that calculates the degree of similarity between each of the 1st to 9th resizing determination template images and a relevant image in the search area; the control device 104 that identifies the matching position of each of the 1st to 9th resizing determination template images in the frame image based on the calculated degrees of similarity; the control device 104 that judges whether or not to change the image size of the initial template image, the synthetic template image, and the resizing determination template images based on the density of the identified matching positions; and the control device 104 that changes the image size of the initial template image to a new image size when the control device 104 determines to change the above-mentioned image size. The control device 104 is configured so that if it determines to change the above-mentioned image size, it updates an image of the new image size including the tracked photographic subject position in the frame image as a new synthetic template image, further divides the updated synthetic template image into a plurality of blocks, and updates an image of the new image size including each block in the input image as a new resizing determination template image. So, the image size of the initial template image, the synthetic template image, and the resizing determination template images can be changed according to changes of the size of the tracked photographic subject. Therefore, the photographic subject whose size is variable can be tracked with excellent precision.

(Variation 1)

The aforementioned embodiment has explained an example in which the synthetic template image is divided into 3×3 blocks and images, each of which is centered at the center position of each divided blocks and has the same size as that of the synthetic template image, are generated as the 1st to 9th resizing determination template images. However, the number of blocks is not limited to 3×3 and the synthetic template image may be divided into any number of blocks other than 3×3 and images including each divided blocks may be generated as the resizing determination template images.

For example, the synthetic template image Tg may be divided into 22 blocks B11 to B14 as shown in FIG. 14(A). In this case, the control device 104 generates images, each of which includes one of blocks B11 to B14 and has the same size as that of the synthetic template image Tg, as 11th to 14th resizing determination template images Tr11 to Tr14 as shown in FIG. 14(B) to (E).

Incidentally, the center position of each block B11 to B14 does not always has to be the center of each of the 11th to 14th resizing determination template images Tr11 to Tr14. Furthermore, the resizing determination template images should preferably be generated so that they includes an edge part of the tracked photographic subject and do not include a background part (part other than the tracked photographic subject) so much. As a result, the edge part of the tracked photographic subject can be tracked using the resizing determination template images, so that whether the size of the tracked photographic subject has changed or not can be identified.

The control device 104 calculates and stores the distance between the center position of each of the 11th to 14th resizing determination template images Tr11 to Tr14 and the center position of the synthetic template image. If the degree of similarity at the matching position of the synthetic template image Tg (that is, the maximum degree of similarity) is equal to or more than a predetermined value when executing the template image size changing processing, the control device 104 returns an affirmative judgment in step S805 described earlier. Then, in step S806 described earlier, the control device 104 calculates the distance between the matching position of each of the 11th to 14th resizing determination template images Tr11 to Tr14 and the matching position of the synthetic template image Tg as the current distance. Then, the control device 104 changes a template size in the same manner as in the aforementioned embodiment.

(Variation 2)

The aforementioned embodiment has described an example in which a template image of 24×24 pixels is generated in the frame image that has been reduced according to the reduction ratio Shuku when the object size which represents the size of the tracked photographic subject is more than 24 pixels. However, if there is no limitation to the maximum value of the size of the template image that can be treated by the template matching processing, a template image of Objectsize×Objectsize may be generated regardless of the size of the object size.

(Variation 3)

The aforementioned embodiment has described an example in which the initial template image and the synthetic template image are used as the template images for tracking to be used to identify the tracked photographic subject position. However, only the initial template image or only the synthetic template image may be used as the template image for tracking. Furthermore, for example, an image in the matching area in the current frame may be used as a template image for tracking for the next frame.

(Variation 4)

The aforementioned embodiment has described an example in which the size of the initial template image and the synthetic template image is the same as the size of the resizing determination template image. However, the size of the initial template image and the synthetic template image may be different from the size of the resizing determination template image.

(Variation 5)

The aforementioned embodiment has described an example in which the control device 104 generates the initial template image by using the results of the binarization processing and the labeling processing which are executed on the frame image. However, the initial template image may be generated by other methods. For example, the control device 104 may generate the initial template image by prompting the user to designate the tracked photographic subject area in the frame image and cutting out an image in the area inputted by the user through an operation of the operation member 101.

(Variation 6)

The aforementioned embodiment has described an example in which the bilinear method is used as an image resizing method. However, for example, a nearest neighbor method or a bi-cubic method may be used as the image resizing method.

(Variation 7)

The aforementioned embodiment has described an example in which the control device 104 tracks the photographic subject in a live view image. However, if the camera 100 has a movie capturing function, the control device 104 may track the photographic subject between frames of a moving image instead of a live view image.

(Variation 8)

The aforementioned embodiment has described an example in which the control device 104 mounted in the camera 100 tracks the photographic subject by executing the processing shown in FIG. 2. However, it is possible to store the program, which executes the processing in FIG. 2, in another terminal such as a personal computer and executes the processing in that terminal. In this case, the photographic subject can be tracked between frames of a moving image by copying moving image data captured by the camera to the terminal and executing the processing on the moving image data. The present invention can also be applied to a cell phone equipped with a camera.

The above description shows just an example and the present invention is not limited to the configuration of the above embodiments. Furthermore, the configuration of each variation may be combined with the aforementioned embodiment.

The disclosure of the following priority application is herein incorporated by reference: Japanese Patent Application No. 2012-158795 filed on Jul. 17, 2012.

REFERENCE SIGNS LIST 100 camera; 101 operation member; 102 lens; 103 image sensor; 104 control device; 105 memory card slot; and 106 monitor.

The invention claimed is:

1. A photographic subject tracking device, comprising:
a memory that stores instructions; and
a processor that executes the instructions stored in the memory to:
set a search area in an input image;
calculate a first degree of similarity between a template image for tracking and an image in the search area;
identify a tracked photographic subject position in the input image based on the first degree of similarity;
calculate a second degree of similarity between each of multiple template images for resizing determination, which are generated based on the template image for tracking, and the image in the search area;
identify matching positions of the multiple template images for resizing determination, respectively, in the input image based on second degrees of similarity; and
change an image size of the template image for tracking and the template images for resizing determination based on a density of the plurality of matching positions.

2. The photographic subject tracking device according to claim 1, wherein:
when the density of the plurality of matching positions has changed by a predetermined amount or more, the processor changes the image size of the template image for tracking and the template images for resizing determination.

3. The photographic subject tracking device according to claim 1, wherein:
when the density of the plurality of matching positions has changed to a higher value, the processor reduces the image size; and when the density of the plurality of matching positions has changed to a lower value, the processor increases the image size.

4. The photographic subject tracking device according to claim 1, wherein:
the processor selects matching positions, whose second degrees of similarity are equal to or higher than a predetermined value, from among the plurality of matching positions, and changes the image size based on the density of the selected matching positions.

5. The photographic subject tracking device according to claim 1, wherein:
each of the multiple template images for resizing determination is an image containing a different part of the template image for tracking.

6. The photographic subject tracking device according to claim 5, wherein:
each of the multiple template images for resizing determination is an image of a predetermined size, each image of the predetermined size being centered at a center position of one of a plurality of blocks into which the template image for tracking is divided.

7. The photographic subject tracking device according to claim 6, wherein:
the processor changes the image size of the template image for tracking and the template images for resizing determination based on the density of matching positions of template images for resizing determination other than one template image for resizing determination, with reference to a matching position of the one template image for resizing determination which is centered at the center position of the center block among the plurality of blocks.

8. The photographic subject tracking device according to claim 7, wherein:
when a maximum degree of similarity between the one template image for resizing determination, which is centered at the center position of the center block among the plurality of blocks, and the image in the search area is equal to or more than a predetermined value, the processor determines whether or not to change the image size of the template image for tracking and the template images for resizing determination.

9. A photographic subject tracking device comprising:
a memory that stores instructions; and a processor that executes the instructions stored in the memory to:
a search area in an input image;
calculate a degree of similarity between an initial template image and an image in the search area and a degree of similarity between a synthetic template image and the image in the search area;
identify a tracked photographic subject position in the input image based on the degrees of similarity;
judge whether or not to update the synthetic template image, based on the degrees of similarity;
an image, which is obtained by synthesizing an image including the tracked photographic subject position in the input image with the initial template image, as a new synthetic template image when the processor determines to update the synthetic template image;
calculate another degree of similarity between each of multiple template images for resizing determination and the image in the search area;
identify matching positions of the multiple template images for resizing determination, respectively, in the input image based on the other degrees of similarity;
judge whether or not to change an image size of the initial template image, the synthetic template image, and the template images for resizing determination, based on a density of the plurality of matching positions; and
change the image size of the initial template image to a new image size when processor determines to change the image size;
wherein when the processor determines to change the image size, the processor sets an image of the new image size, including the tracked photographic subject position in the input image, as a new updated synthetic template image, further divides the updated synthetic template image into a plurality of blocks, and sets images of the new image size, each including one of the blocks in the input image, as new updated template images for resizing determination.

10. A photographic subject tracking device comprising:
a memory that stores instructions; and
a processor that executes the instructions stored in the memory to:
track a specified photographic subject in an image based on a first template image;
identify a position in the image based on a plurality of second template images, the plurality of second template images being generated based on the first template image,
detect a change of a size of the specified photographic subject; and
update the first template image based on a plurality of positions when the processor detects that the size of the specified photographic subject has changed by a predetermined amount or more.

11. A camera comprising the photographic subject tracking device according to claim 1.

* * * * *